(12) United States Patent
Kornfeld

(10) Patent No.: US 12,180,845 B1
(45) Date of Patent: Dec. 31, 2024

(54) AIRCRAFT DUCT ASSEMBLY AND SEALING STRUCTURE

(71) Applicant: Spirit AeroSystems, Inc., Wichita, KS (US)

(72) Inventor: Roger Edmund Kornfeld, Whitewater, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 0 days.

(21) Appl. No.: 18/330,540

(22) Filed: Jun. 7, 2023

(51) Int. Cl.
  *F01D 11/08* (2006.01)
  *B64D 29/00* (2006.01)

(52) U.S. Cl.
  CPC .............. *F01D 11/08* (2013.01); *B64D 29/00* (2013.01); *F05D 2240/55* (2013.01)

(58) Field of Classification Search
  CPC ...... F01D 11/08; B64D 29/00; F05D 2240/55
  USPC ..................................... 415/173.1; 29/889.22
  See application file for complete search history.

(56) References Cited

U.S. PATENT DOCUMENTS

| | | | |
|---|---|---|---|
| 7,942,636 B2 * | 5/2011 | Evans ................... | F01D 11/006 416/193 R |
| 9,840,929 B2 * | 12/2017 | Barnett .................... | F01D 9/042 |
| 11,060,411 B2 * | 7/2021 | Urac ....................... | F01D 5/282 |
| 2020/0018179 A1 * | 1/2020 | Kling .................... | F01D 11/008 |
| 2020/0217217 A1 * | 7/2020 | Girard ....................... | F01D 5/02 |

* cited by examiner

*Primary Examiner* — J. Todd Newton
(74) *Attorney, Agent, or Firm* — Stinson LLP

(57) ABSTRACT

A sealing structure seals a space between first and second parts of a fan duct and a fairing of an aircraft engine. The sealing structure comprises first and second seal portions for positioning between the first and second parts of the fan duct and the fairing. The first seal portion includes an elongated middle region and a first coupling mechanism. The elongated middle region can be secured to the first part of the fan duct and abutting the fairing and includes a forward end from which the first coupling mechanism extends. The second seal portion includes an elongated middle region and a second coupling mechanism. The elongated middle region can be secured to the second part of the fan duct and abutting the fairing and includes a forward end from which the second coupling mechanism extends. The second coupling mechanism is operable to couple to the first coupling mechanism.

20 Claims, 24 Drawing Sheets

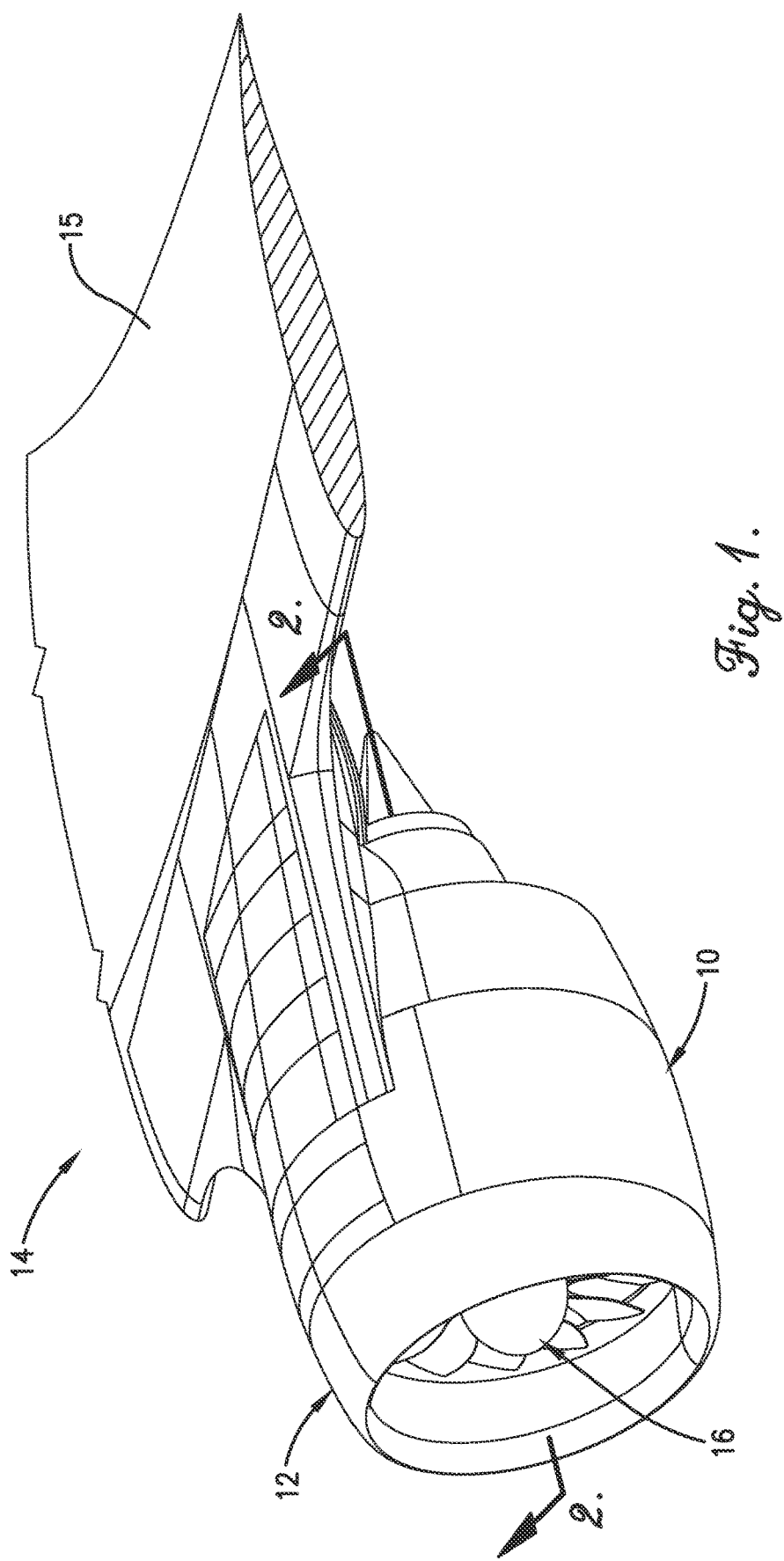

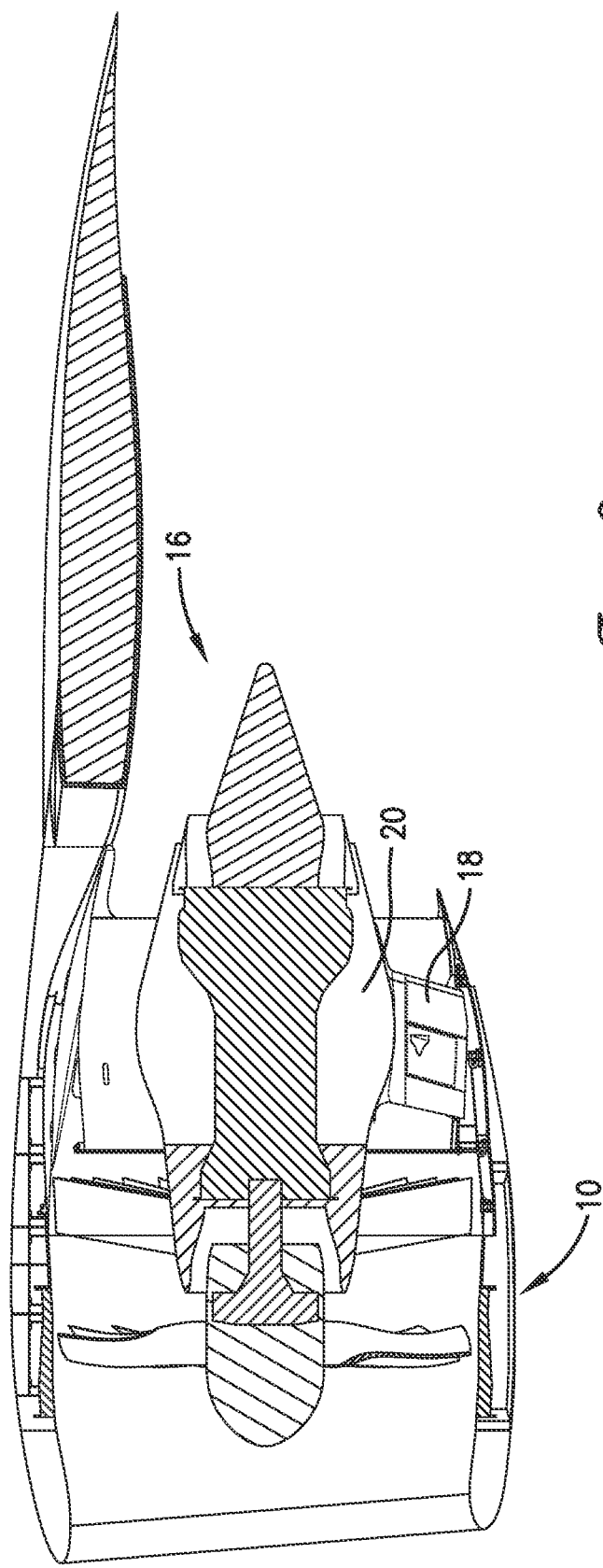

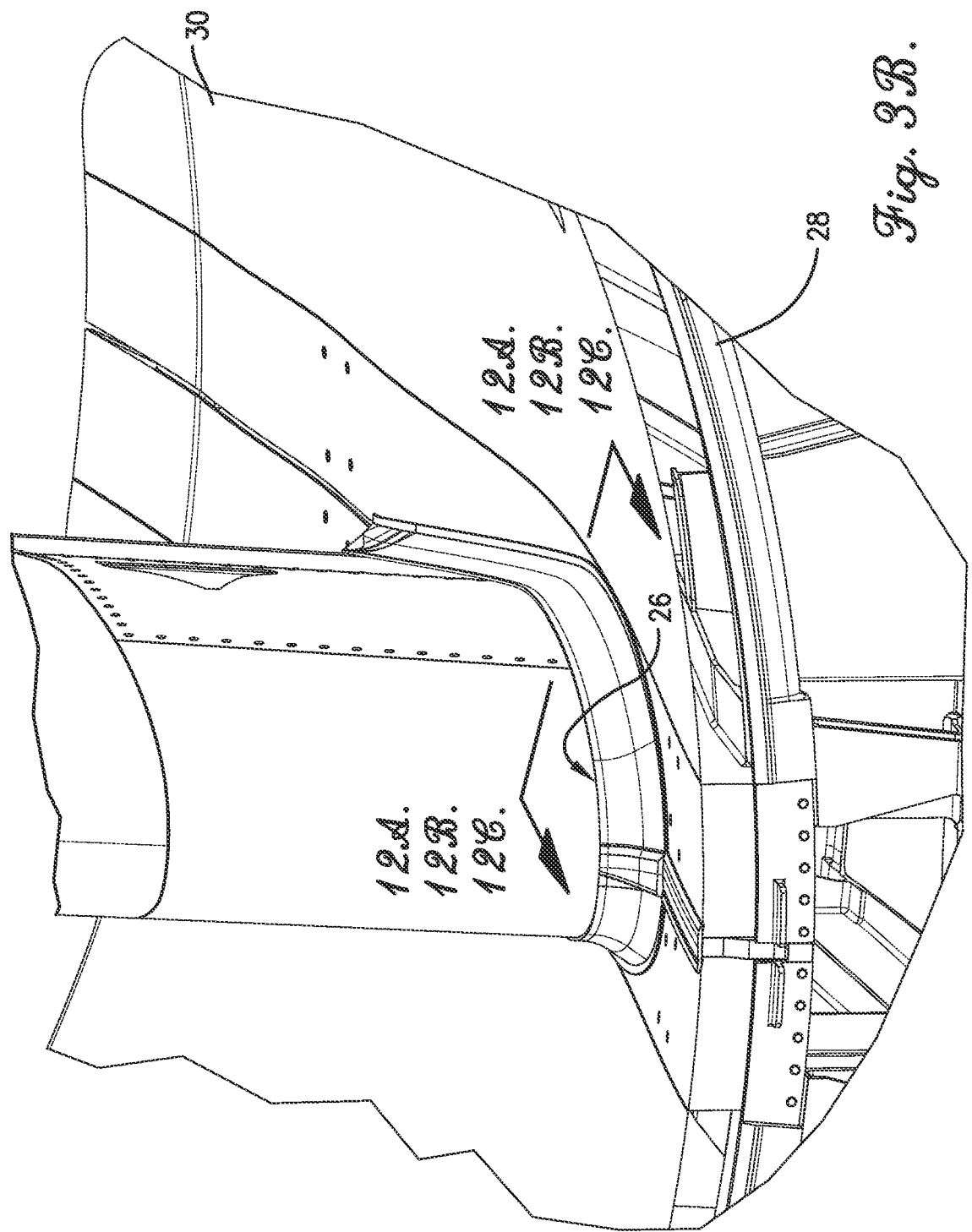

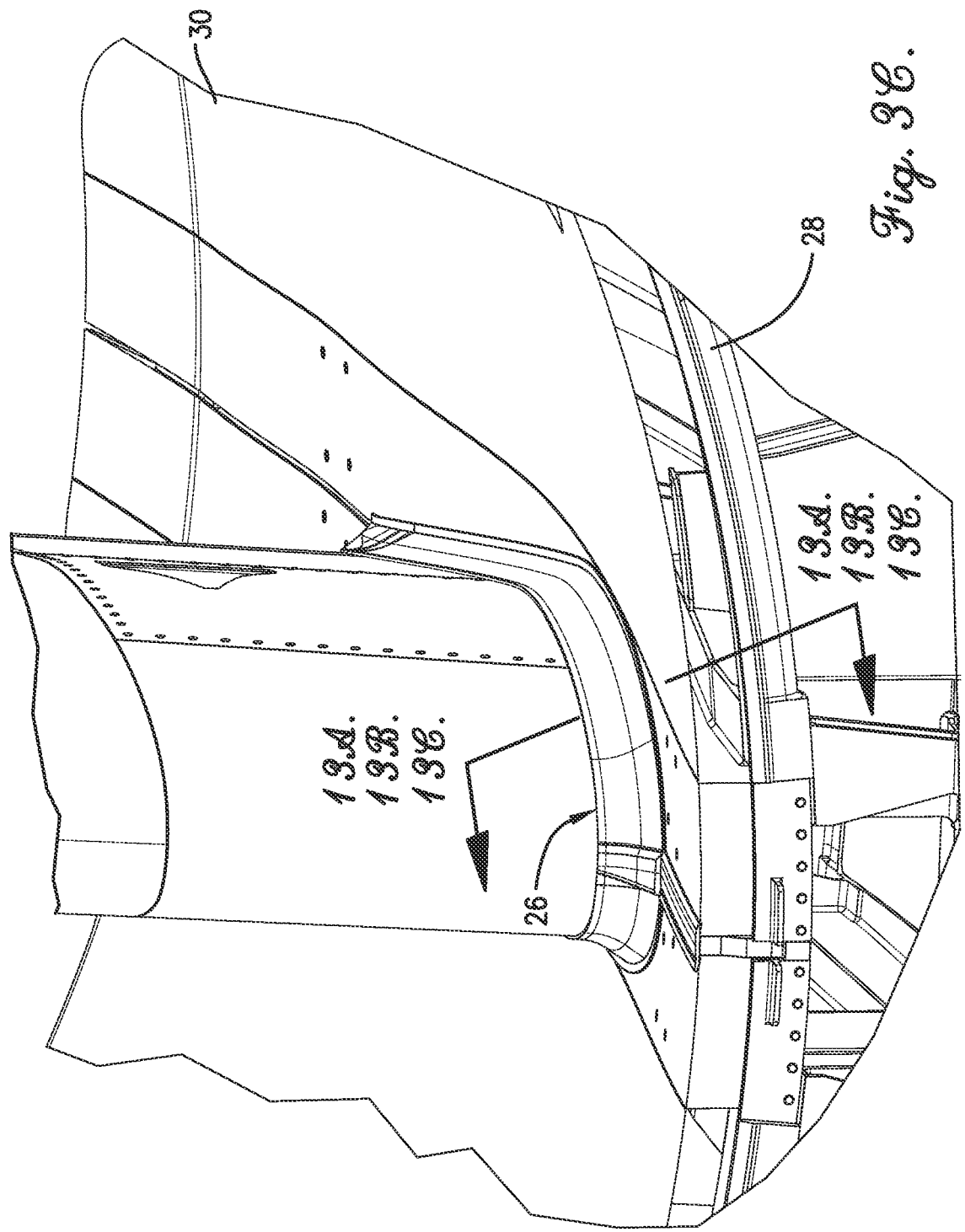

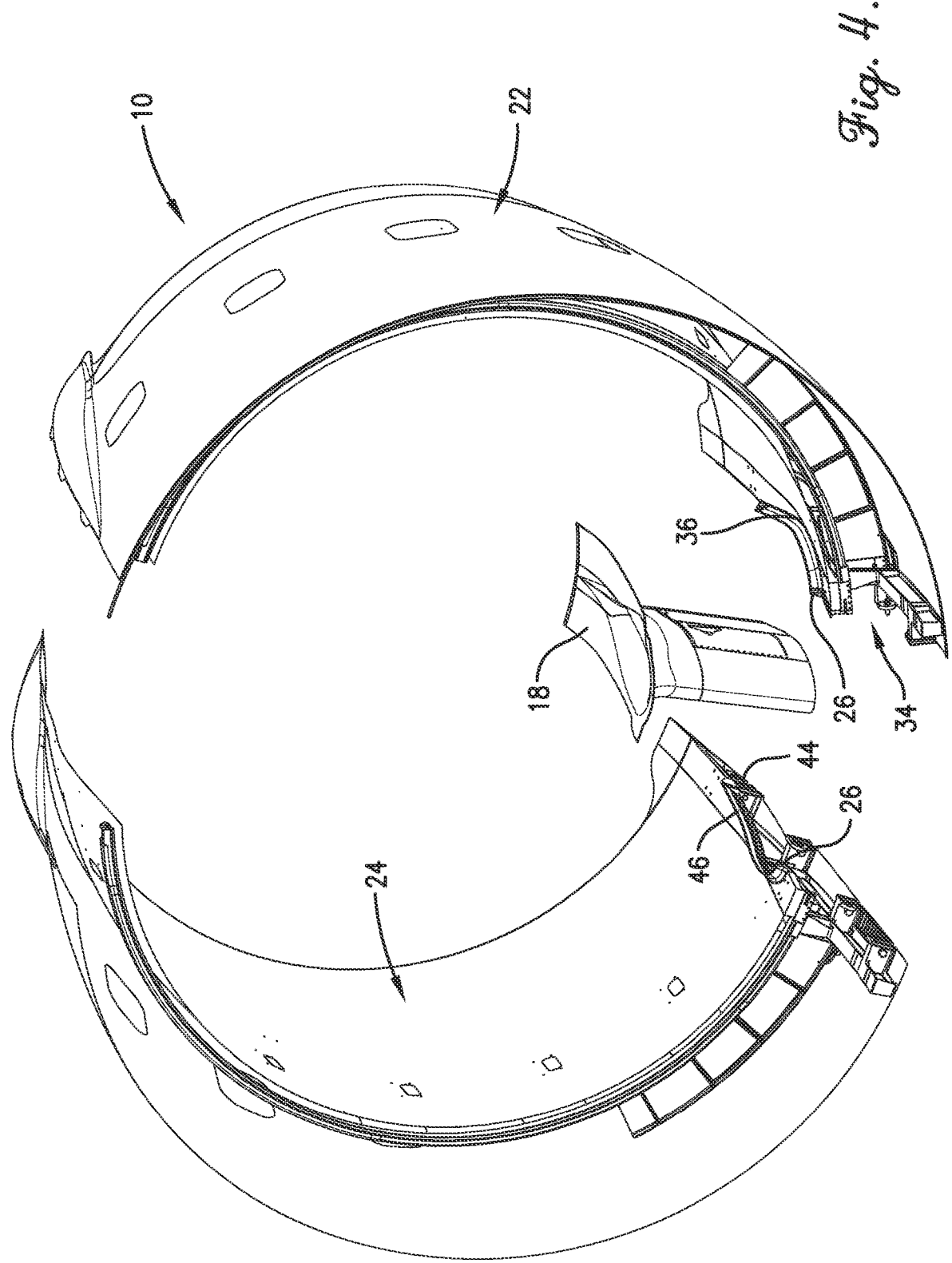

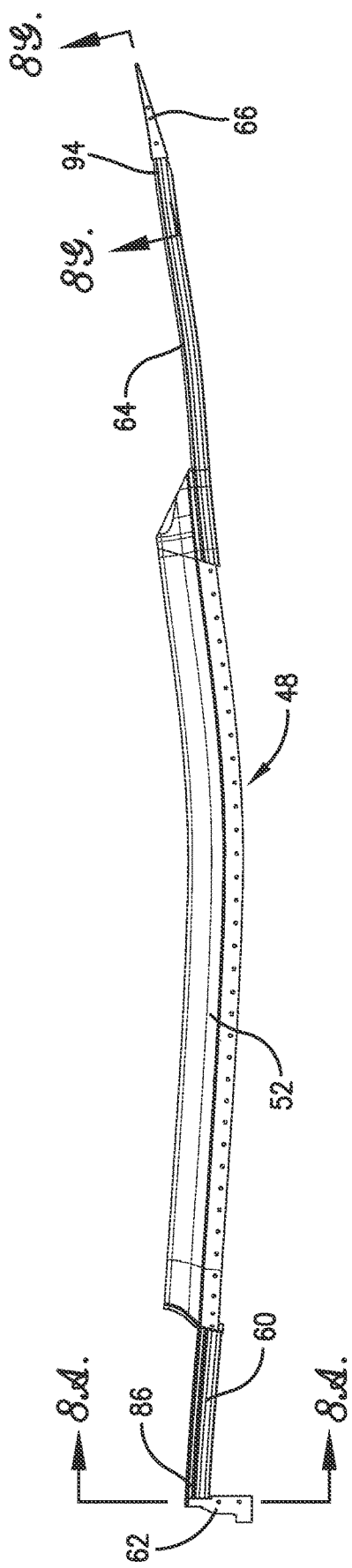

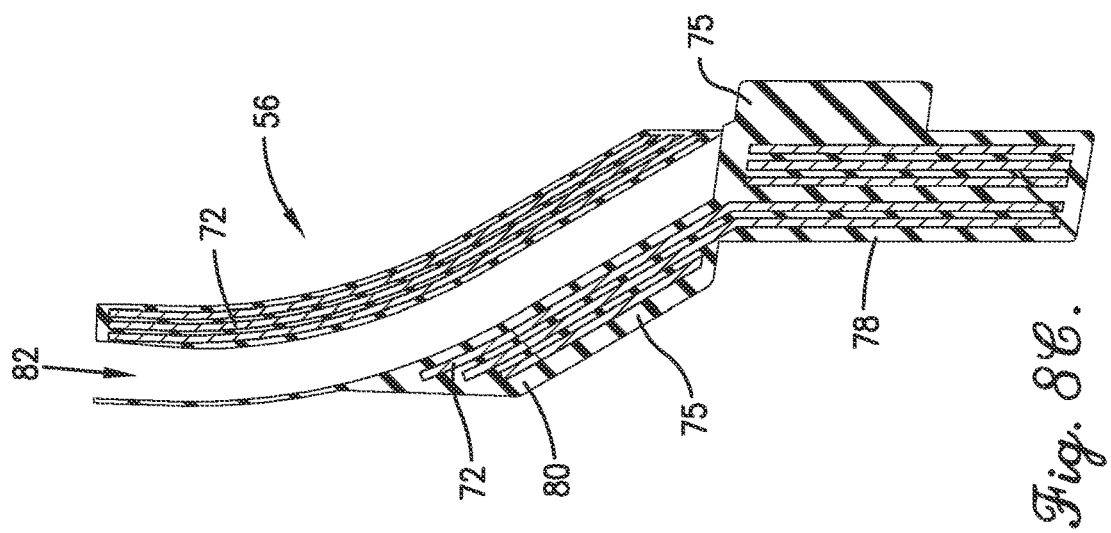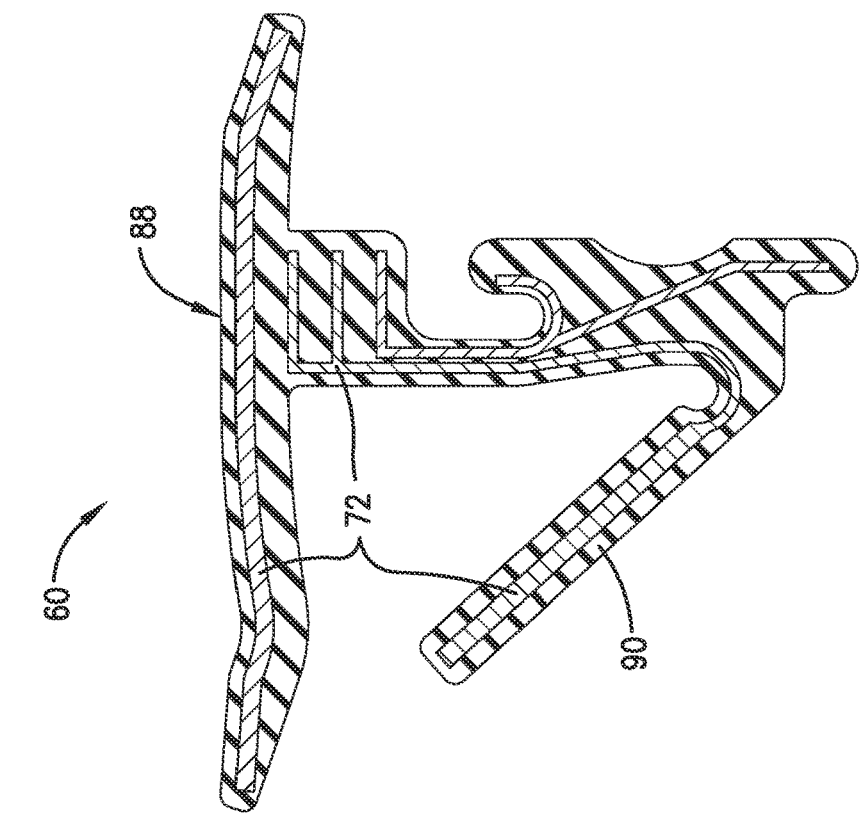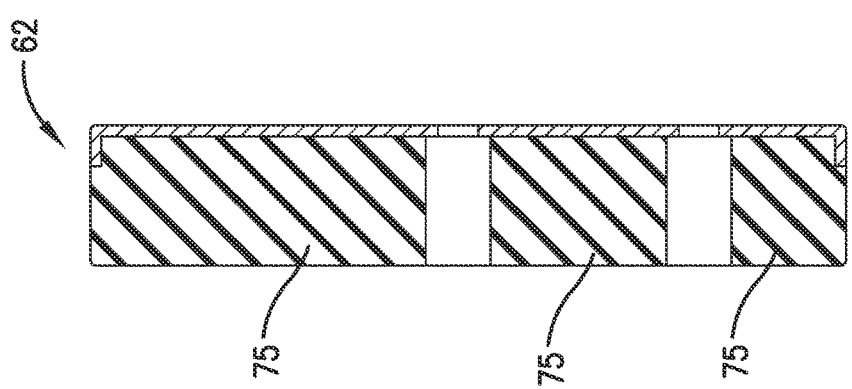

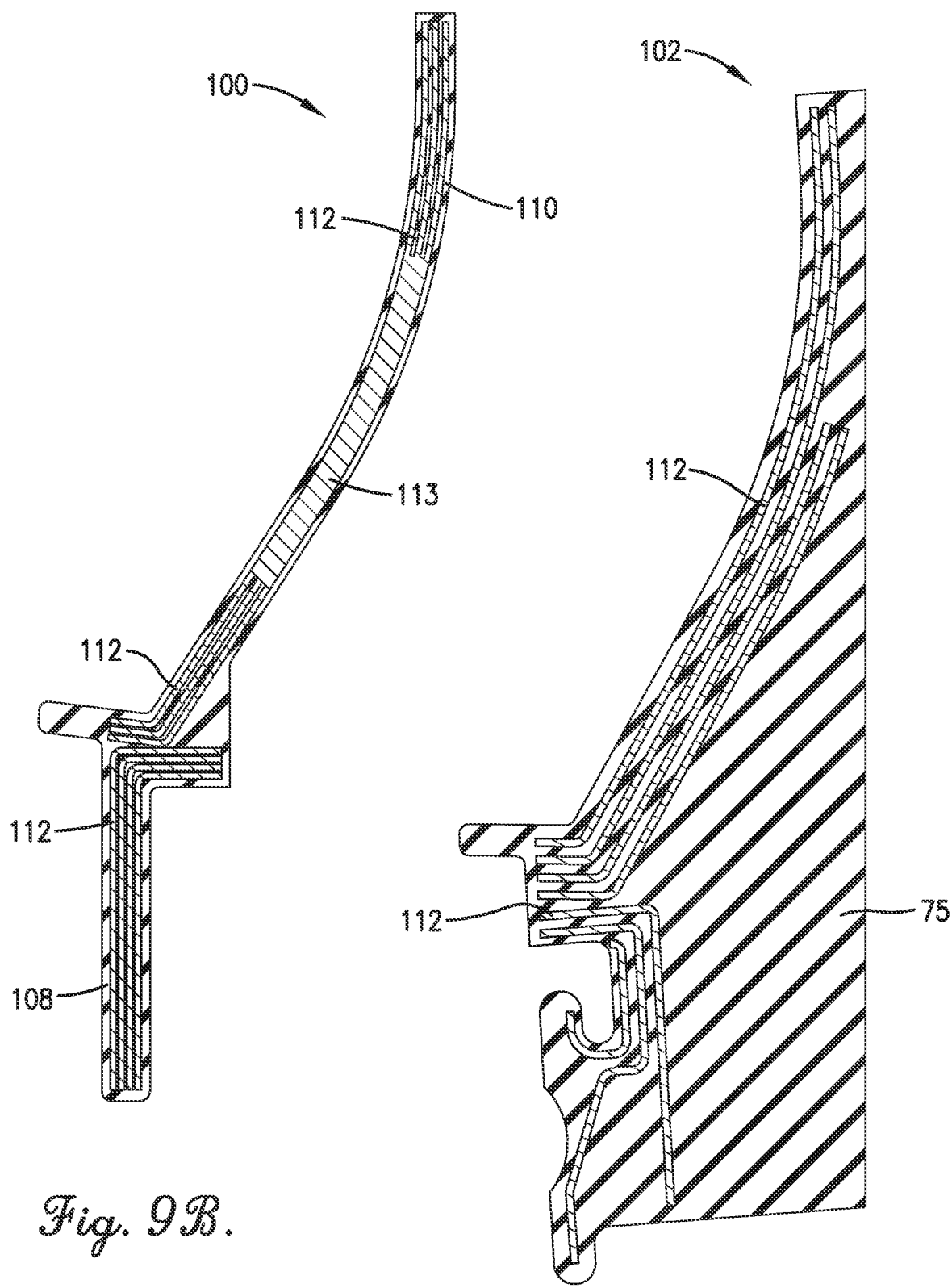

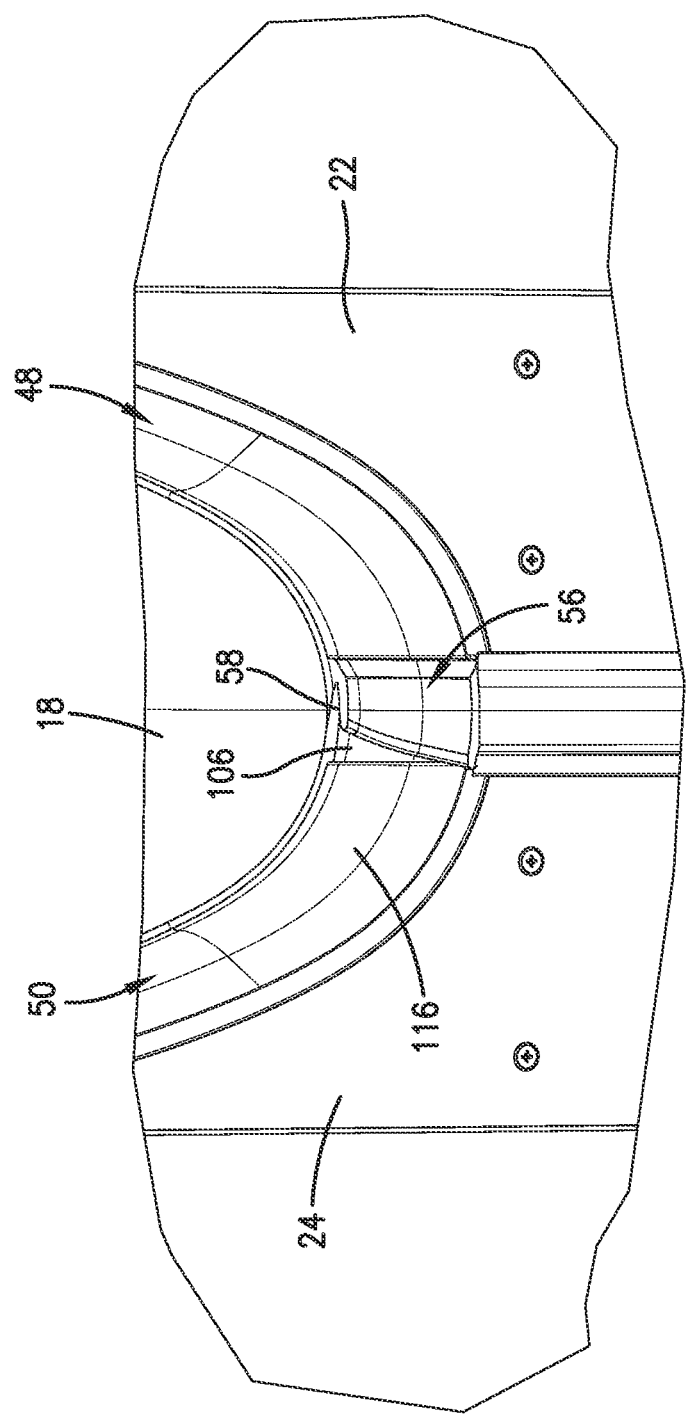

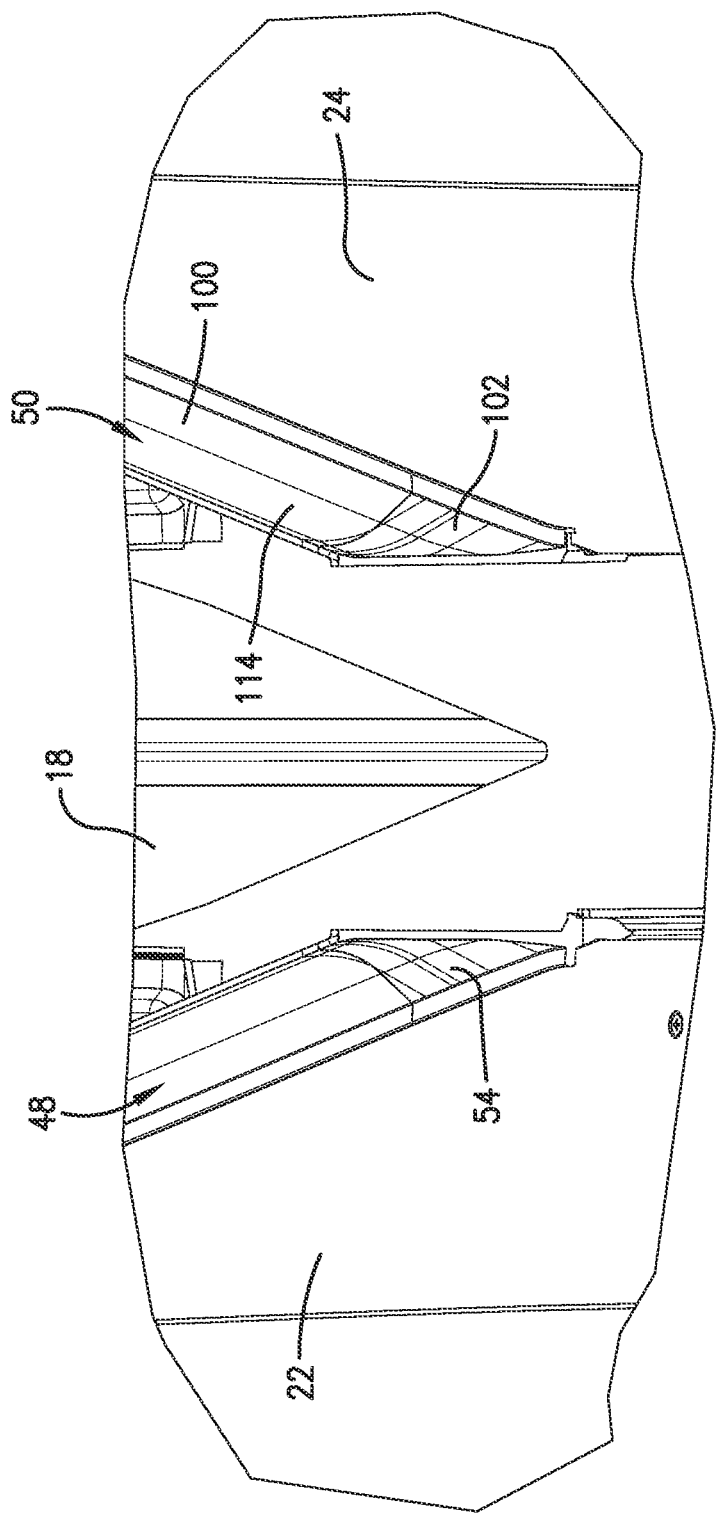

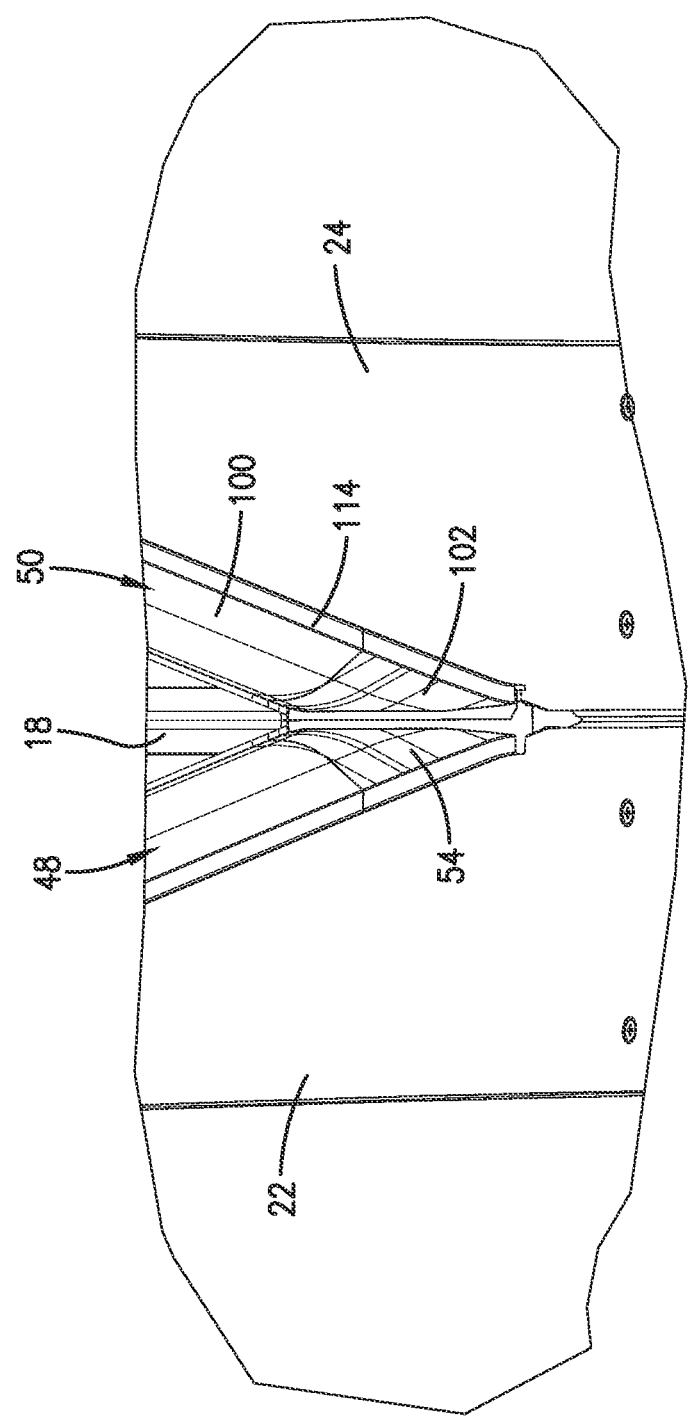

AIRCRAFT DUCT ASSEMBLY AND SEALING STRUCTURE

BACKGROUND

In order to reduce greenhouse gas emissions and cabin noise while meeting demand for air travel, aircraft engine manufacturers have developed larger, more efficient engines with larger engine fans enclosed in nacelles with higher bypass ratios. In order to achieve the higher bypass ratios, internal diameters of the aircraft engine nacelles are increased. However, this creates various complications for the nacelles, including routing system lines from the engines to the nacelles. Accordingly, there remains a need for further contributions in this area of technology. The background discussion is intended to provide information related to the present invention which is not necessarily prior art.

SUMMARY OF THE INVENTION

The present invention solves the above-described problems and other problems by providing a sealing structure for sealing a space between first and second parts of a fan duct and a fairing of an aircraft engine and providing an aircraft duct assembly having such a sealing structure.

A sealing structure constructed according to an embodiment of the present invention comprises a first seal portion and a second seal portion. The first seal portion is for positioning between a fairing and a first part of a fan duct. The first seal portion comprises an elongated middle region and a first coupling mechanism. The elongated middle region is for securing to the first part of the fan duct and abutting the fairing and includes a forward end. The first coupling mechanism extends from the forward end of the middle region. The second seal portion is for positioning between the fairing and a second part of the fan duct. The second seal portion comprises an elongated middle region and a second coupling mechanism. The elongated middle region is for securing to the second part of the fan duct and abutting the fairing and includes a forward end.

The second coupling mechanism extends from the forward end of the middle region of the second seal portion and is operable to couple to the first coupling mechanism. This provides a seal between the fan duct and the fairing, which improves the fan duct efficiency and performance and provides a very low rate of leakage of fan duct pressure.

An aircraft duct assembly according to an embodiment of the present invention broadly comprises a first duct wall, a second duct wall, and a sealing structure. The first duct wall comprises a first forward edge, a first aft edge opposite the first forward edge, and a first duct interface extending from the first forward edge to the first aft edge and having a first recess that defines a portion of a cavity for receiving an engine fairing. The second duct wall cooperatively encloses at least a portion of the engine with the first duct wall and comprises a second forward edge, a second aft edge opposite the second forward edge, and a second duct interface extending from the second forward edge to the second aft edge and having a second recess that defines a portion of the cavity for receiving the engine fairing.

The sealing structure seals a space between the engine fairing and the first duct wall and the second duct wall and comprises a first seal portion and a second seal portion. The first seal portion is secured to at least a portion of the first duct interface and comprises a forward end with a first coupling mechanism. The second seal portion is secured to at least a portion of the second duct interface and comprises a forward end with a second coupling mechanism that couples to the first coupling mechanism. An aircraft duct that provides a seal against an engine fairing enables improved efficiency of the engine. It also allows the air duct walls to be readily moved away from the fairing to access the engine.

A sealing structure according to another embodiment of the present invention broadly comprises a first seal portion and a second seal portion. The first seal portion is for positioning between a fairing and a first part of a fan duct. The first seal portion comprises an elongated middle region, an aft fairing block, a forward transition block, and a first coupling mechanism. The elongated middle region includes a tab portion for securing to the first part of the fan duct and a flexible center blade extending at an angle relative to the tab portion for abutting the fairing. The aft fairing block extends from the middle region and comprises compressible material. The forward transition block extends from the elongated middle region opposite to the aft fairing block and includes compressible material. The first coupling mechanism is connected to the forward transition block.

The second seal portion is for positioning between the fairing and the second part of the fan duct and comprises an elongated middle region, an aft fairing block, a forward transition block, and a second coupling mechanism. The elongated middle region of the second seal portion includes a tab portion for securing to the second part of the fan duct and a flexible center blade extending at an angle relative to the tab portion for abutting the fairing. The aft fairing block of the second seal portion extends from the middle region and is operable to abut the aft fairing block of the first seal portion. The forward transition block extends from the elongated middle region of the second seal portion opposite to the aft fairing block of the second seal portion. The second coupling mechanism is operable to couple to the first coupling mechanism.

The flexible center blades of the first and second seal portions are able to maintain a seal with the fairing when the fairing experiences a wide amount of lateral displacement relative to the fan duct. The compressible material of the aft fairing and forward transition blocks of the first seal portion enable a tight seal against the aft fairing and forward transition blocks of the second seal portion while also maintaining the seal when the fairing experiences a wide amount of radial displacement relative to the fan duct.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a perspective view of an exemplary nacelle attached to a portion of an aircraft wing in which embodiments of the present invention may be incorporated;

FIG. 2 is a cross sectional view of the nacelle of FIG. 1;

FIG. 3B is an enlarged view of the duct assembly of FIG. 3A;

FIG. 3C is an enlarged view of the duct assembly of FIG. 3A;

FIG. 4 is a front perspective view of the duct assembly of FIG. 3 in an open position around the engine fairing;

FIG. 7 is a side view of a first seal portion of the sealing structure of FIG. 5;

FIG. 8A is a sectional view of a forward duct block of the first seal portion of FIG. 7 along line 8A-8A;

FIG. 8B is a sectional view of a forward elongated portion of the first seal portion of the sealing structure of FIG. 6 along line 8B-8B;

FIG. 8C is a sectional view of a forward transition block of the first seal portion of the sealing structure of FIG. 6 along line 8C-8C;

FIG. 9B is a sectional view of an elongated middle region of the second seal portion of the seal structure of FIG. 6 along line 9B-9B;

FIG. 9C is a sectional view of an aft fairing block of the second seal portion of the seal structure of FIG. 6 along line 9C-9C;

FIG. 10B is a fragmentary front perspective view of the duct assembly of FIG. 3 with the coupling mechanisms of the sealing structure coupled to one another;

FIG. 11A is a fragmentary rear perspective view of the duct assembly of FIG. 3 with aft fairing blocks of the sealing structure separated;

FIG. 11B is a fragmentary rear perspective view of the duct assembly of FIG. 3 with the aft fairing blocks of the sealing structure abutting one another;

Figure 3A:
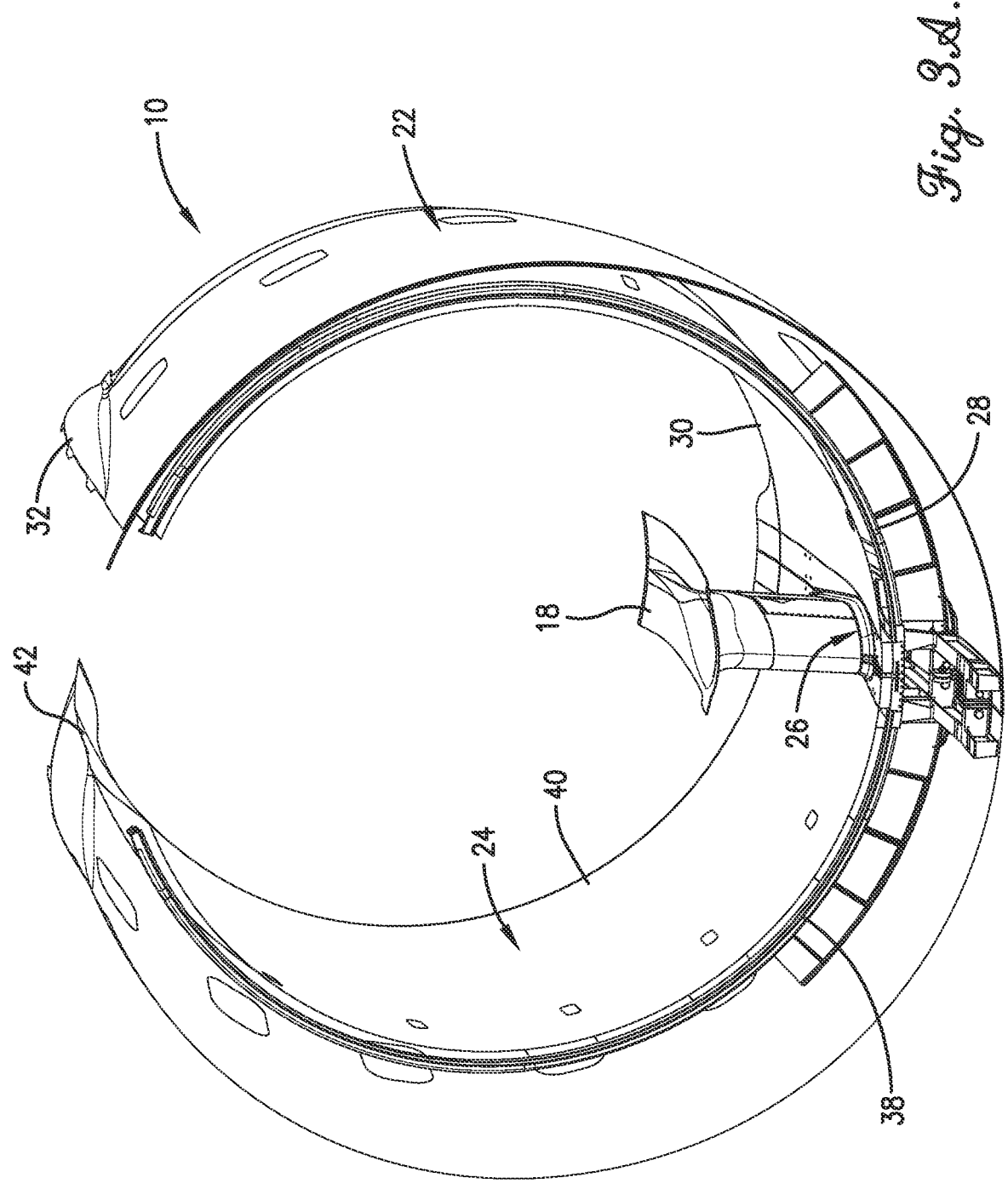
FIG. 3A is a front perspective view of a duct assembly constructed in accordance with an embodiment of the present invention and in a closed position around an engine fairing.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an aircraft duct assembly 10 constructed in accordance with an embodiment of the invention is implemented in an exemplary nacelle 12 of an aircraft 14. The illustrated duct assembly 10 at least partially encases an aircraft engine 16 and is supported on the aircraft 14, such as on the wing 15. Turning to FIG. 2, in order to achieve a higher bypass ratio (and thereby increase efficiency and reduce greenhouse gas emissions), an internal diameter of the duct assembly 10 must be relatively larger, which requires the use of an engine fairing 18 as a conduit for engine system lines extending from the engine core 20. The engine system lines may include hydraulic conduit or tubes, electrical conductors, or the like. The duct assembly 10 has a diameter large enough to accommodate a fan of the engine 16 of any size without departing from the scope of the present invention.

Turing to FIGS. 3A and 4, the duct assembly 10 is operable to receive a portion of the fairing 18 (depicted in FIG. 3A), and in some embodiments, the duct assembly 10 is operable to pivot away from the fairing 18 (depicted in FIG. 4) to provide access to the engine 16. To achieve a high fan duct efficiency for the higher bypass ratio and improve performance, the fan duct must have a low rate of leakage of fan duct pressure. To accomplish this, the interface between the aircraft duct assembly 10 and the fairing 18 must be sealed. Thus, the duct assembly 10 comprises a first duct wall 22, a second duct wall 24, and a sealing structure 26 for sealing a space between the engine fairing 18 and the duct walls 22, 24.

The first duct wall 22 comprises a forward edge 28, an aft edge 30 opposite to the forward edge 28, a top portion 32 that may be hingedly connected to the wing 15, and a duct interface 34 (depicted in FIG. 4) extending from the forward edge 28 to the aft edge 30. The duct interface 34 includes a recess 36 (depicted in FIG. 4) that defines at least a portion of the cavity that receives the engine fairing 18.

The second duct wall 24 cooperatively encloses at least a portion of the engine 16 with the first duct wall 22 and also comprises a forward edge 38, an aft edge 40 opposite to the forward edge 38, a top portion 42 which may be hingedly connected to the wing 15, and a duct interface 44 (depicted in FIG. 4) extending from the forward edge 38 to the aft edge 40. The duct interface 44 includes a recess 46 (depicted in FIG. 4) that defines at least a portion of the cavity that receives the engine fairing 18. The recesses 36, 46 of the duct walls 22, 24 may cooperatively form a cavity for receiving the engine fairing 18.

Figure 5:
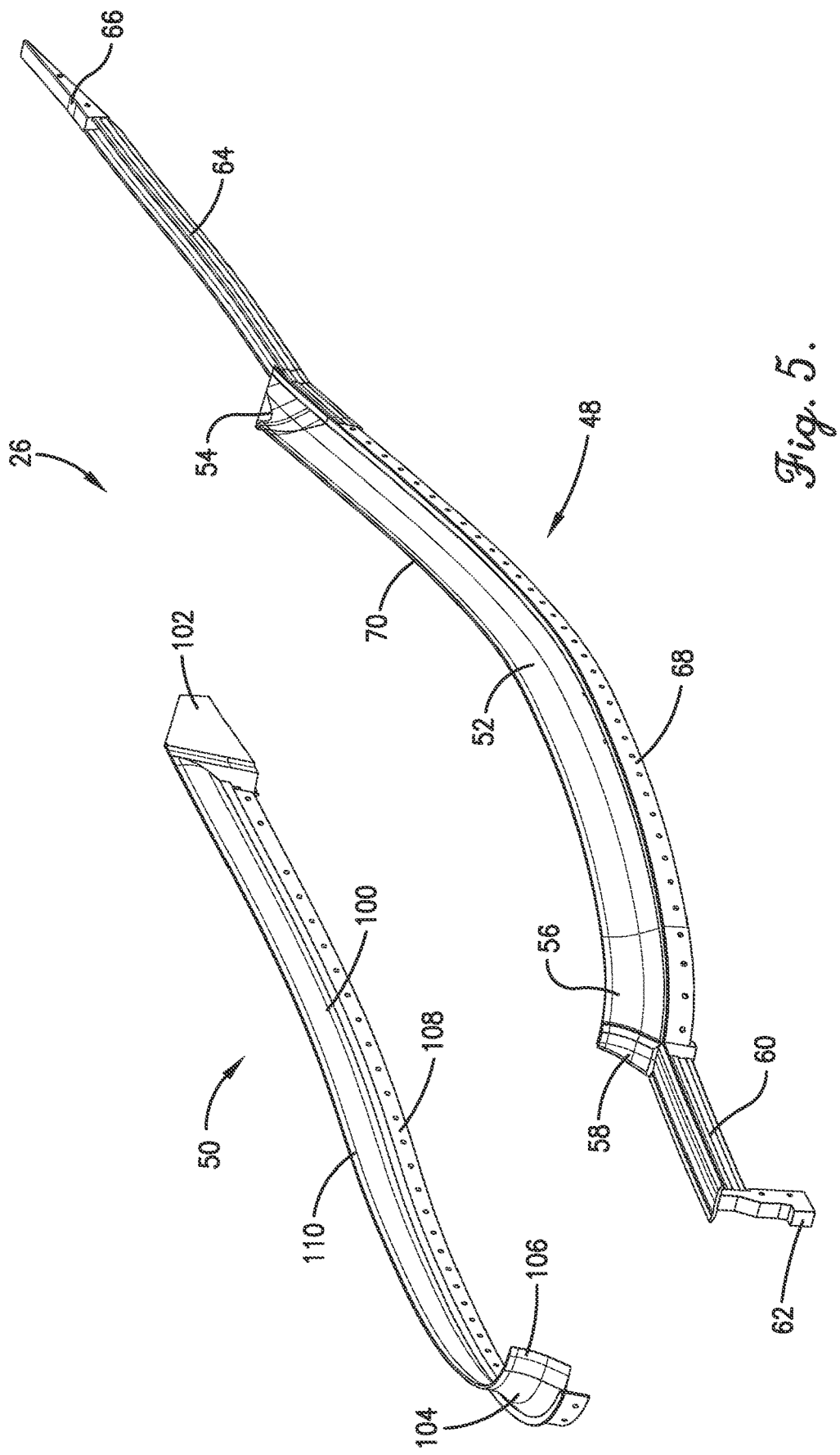
FIG. 5 is a perspective view of a sealing structure of the duct assembly of FIG. 3.

Turning to FIG. 5, the sealing structure 26 comprises a first seal portion 48 for securing to the duct interface 34 of the first duct wall 22 and a second seal portion 50 for securing the duct interface 44 of the second duct wall 24. Generally speaking, the seal components may comprise vulcanized molded elastomeric portions made up of silicone rubber, fiberglass and polyester fabric, and/or sheet foam. The different components may be integral, separate components bonded together via an adhesive (such as silicone adhesive bonding or RTV sealant), and/or secured separately to the first and second duct walls 22, 24.

The first seal portion 48 comprises an elongated middle region 52, an aft fairing block 54, a forward transition block 56, a first coupling mechanism 58, a forward elongated portion 60, a forward duct block 62, an aft elongated portion 64, and an aft duct block 66 connected to the aft elongated portion 64.

The elongated middle region 52 may comprise a tab portion 68 and a flexible center blade 70. The tab portion 68 is for securing to the duct interface 34 of one of the duct walls 22 and may extend the length of the recess 36 of the duct interface 34. The tab portion 68 may be secured to the duct interface 34 via fasteners, bonding or adhesives, or the like. The tab portion 68 may be made of reinforced silicone.

Due to installation tolerances, rigging in a static condition, thermal and structural deflections in flight, the axially and lateral relative motions between the fairing 18 and the duct walls 22, 24 are relatively large. Thus, the flexible blade 70 accommodates large axial and lateral displacements while also not taking up too much space between the fairing 18 and the duct walls 22, 24. Whereas, a bulb seal could not accommodate such wide displacement and would be too large. Further, the blade 70 enables the tongue and groove type of connection (discussed in further detail below) of some embodiments of the present invention.

Figures 8D, 8E:
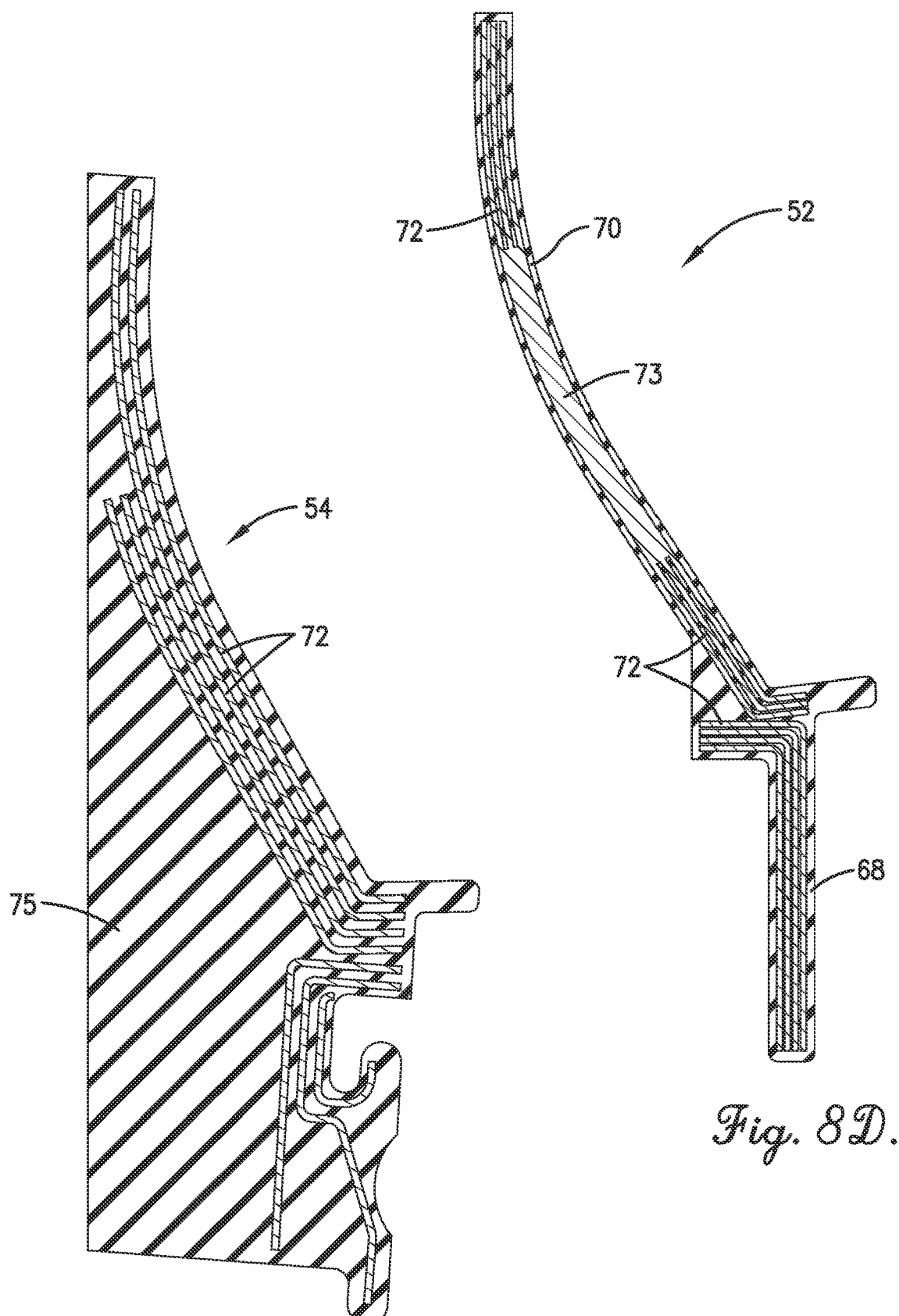
FIG. 8D is a sectional view of an elongated middle region of the first seal portion of the sealing structure of FIG. 6 along line 8D-8D.
FIG. 8E is a sectional view of an aft fairing block of the first seal portion of the sealing structure of FIG. 6 along line 8E-8E.
Figure 12A:
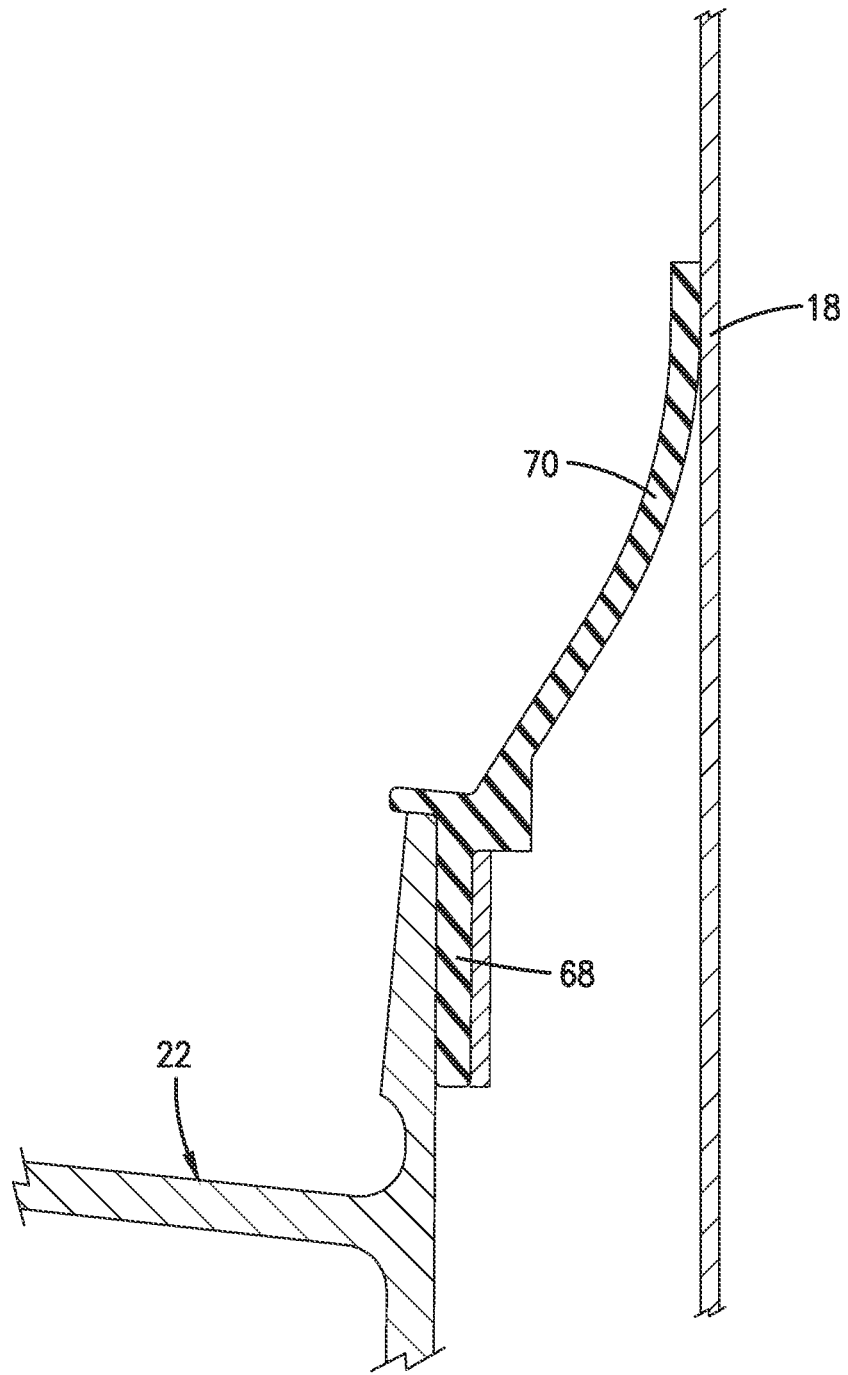
FIG. 12A is a sectional view of the elongated middle region of the first seal portion attached to a duct wall of the duct assembly of FIG. 3B along line 12A, 12B, 12C-12A, 12B, 12C and abutting the engine fairing at a normal position.
Figure 12B:
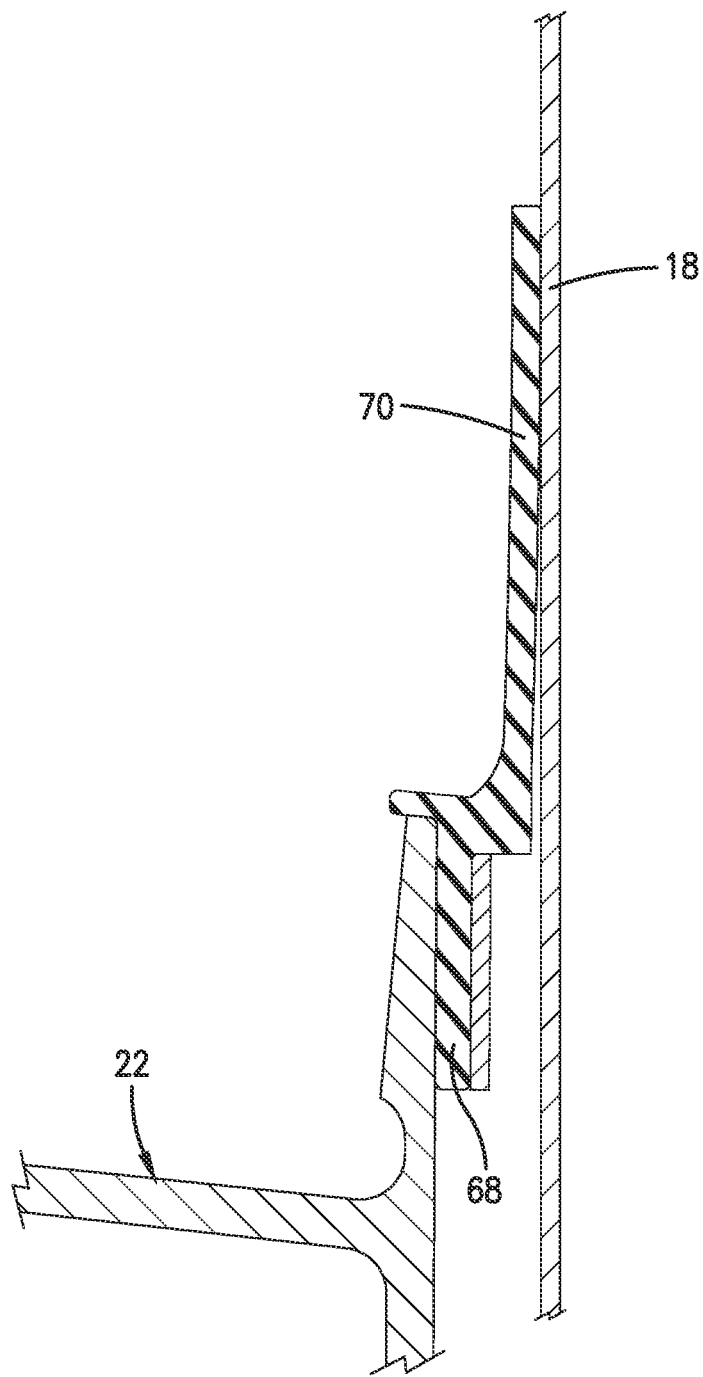
FIG. 12B is a sectional view of the elongated middle region of FIG. 12A abutting the engine fairing at a laterally displaced position proximal to the elongated middle region.
Figure 12C:
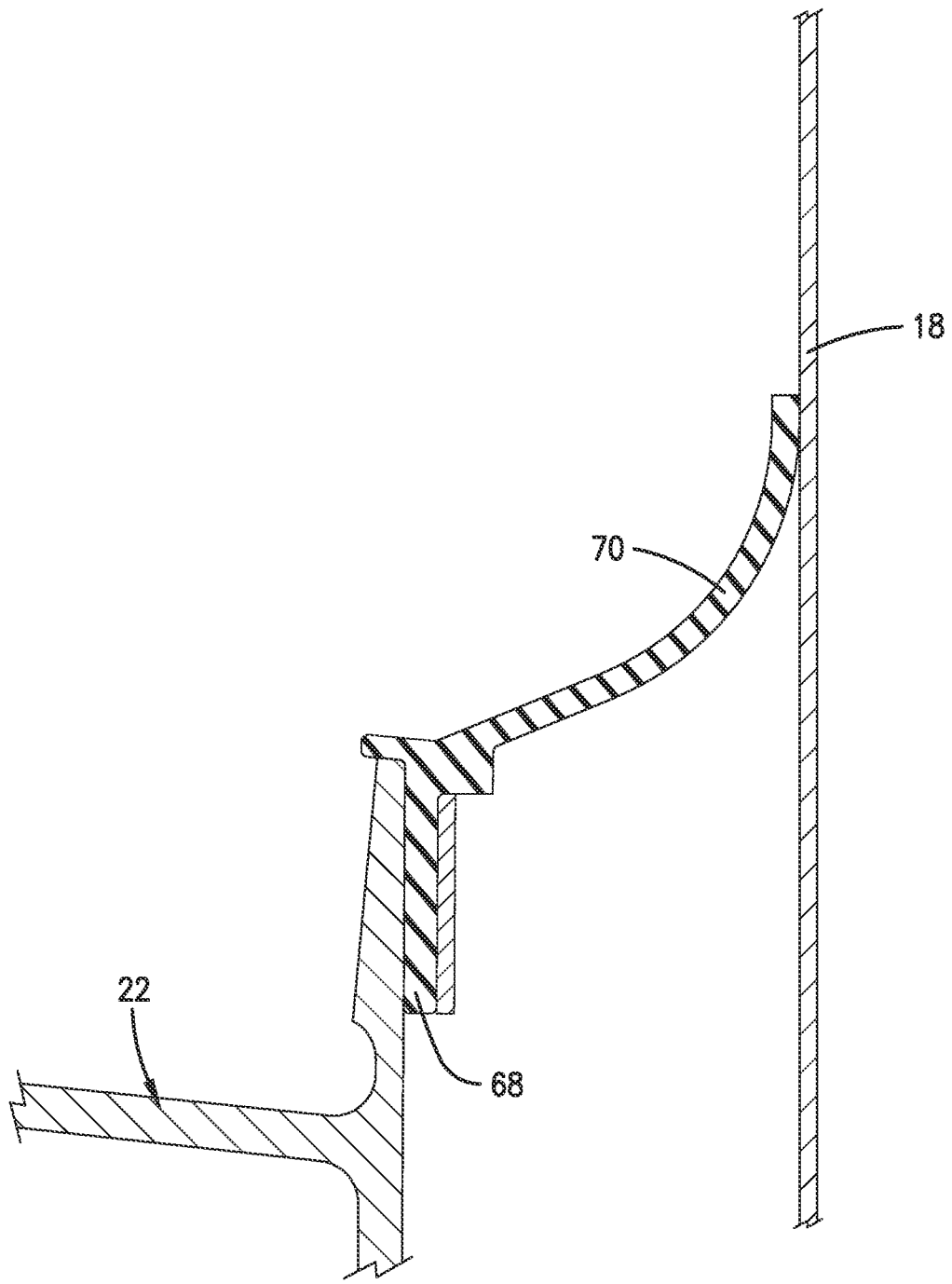
FIG. 12C is a sectional view of the elongated middle region of FIG. 12A abutting the engine fairing at a laterally displaced position distal to the elongated middle region.

The flexible center blade 70 extends at an angle relative to the tab portion 68 (as depicted in FIG. 8D) toward the fairing 18 so that it abuts the fairing 18. The flexible center blade 70 may extend the length of the fairing 18 and may comprise internal pre-preg fiberglass ply reinforcements 72 (as depicted in FIG. 8D) that are staggered in a fore-aft direction to allow for conformance of blade 70 to the fairing 18. The flexible center blade 70 may also include a section of pre-preg material 73 (composite material made of pre-impregnated fibers and a polymer matrix). Turning briefly to FIGS. 12A-12C, too much interface (the blade 70 bending too much against the fairing 18) can affect the quality of the seal at the forward end of the fairing 18. Thus, the center blade 70 is angled relative to the tab portion 68 and sufficiently tall enough to cover the space between the duct wall 22 and the fairing 18. Due to the displacement discussed above, the space may have a length of about 6 millimeters (mm) (such as when the fairing 18 is laterally displaced toward the middle region 52 depicted in FIG. 12B) to about 51 mm (such as when the fairing 18 is laterally displaced away from the middle region 52 depicted in FIG. 12C). Alternatively, the space may have a length of about 12.7 mm (such as when the fairing 18 is laterally displaced toward the middle region 52 depicted in FIG. 12B) to about 45.72 mm (such as when the fairing 18 is laterally displaced away the middle region 52 depicted in FIG. 12C). In other words, the center blade 70 is angled relative to the tab portion 68 and sufficiently tall enough to maintain a seal with the fairing 18 when the fairing 18 is laterally displaced in either direction from a nominal position by about 15 mm to about 20 mm. In preferred embodiments, the center blade 70 is angled relative to the tab portion 68 and sufficiently tall enough to maintain a seal with the fairing 18 when the fairing 18 is laterally displaced about 17.526 mm in either direction from the nominal position. In one or more embodiments, the center blade 70 is angled relative to the tab portion 68 and sufficiently tall enough to maintain a seal with the fairing 18 when the fairing 18 is laterally displaced by any length without departing from the scope of the present invention.

Figure 6:
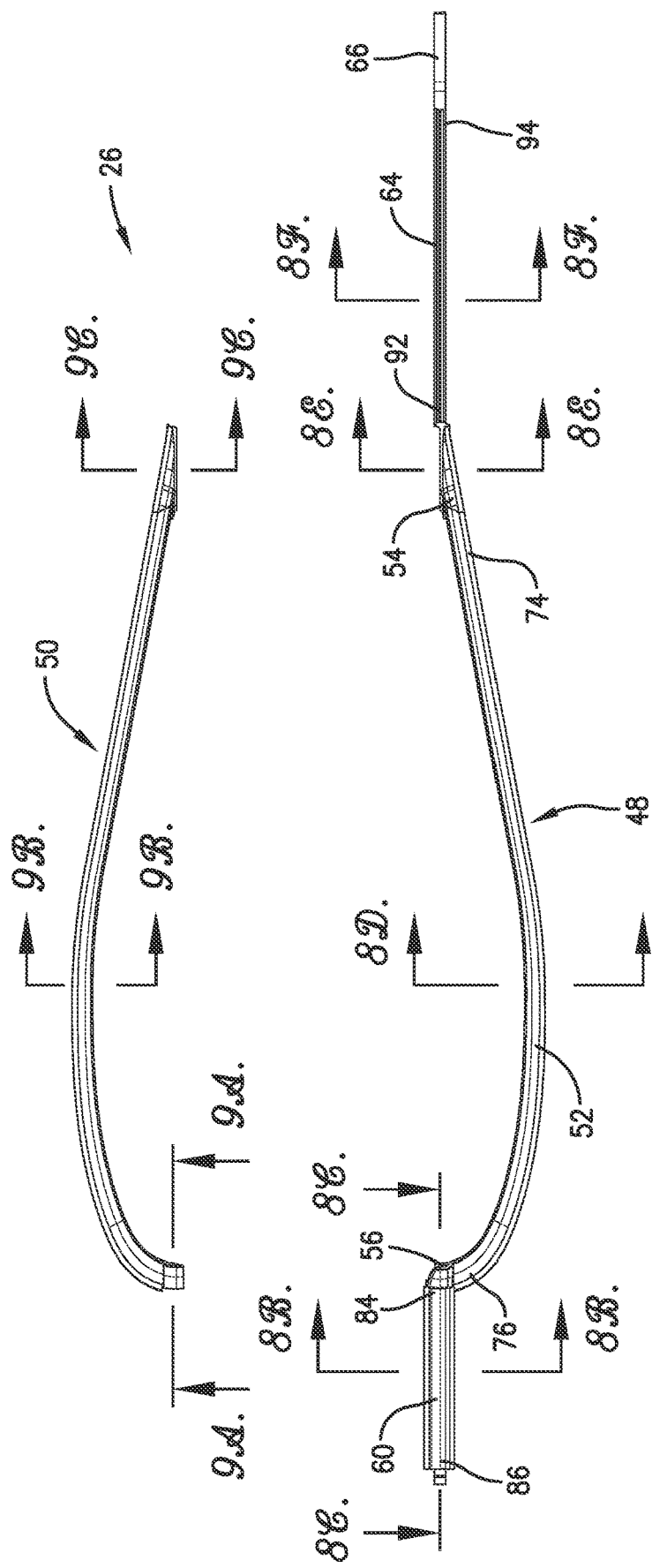
FIG. 6 is a top plan view of the sealing structure of FIG. 5.

Turning to FIG. 6, the aft fairing block 54 extends from the middle region 52. Specifically, the aft fairing block 54 may extend from an aft end 74 of the middle region 52. The aft fairing block 54 may have an aerodynamic shape, such as a tetrahedronal shape pointed in an aft direction and may comprise compressible material. For example, as shown in FIG. 8E, the aft fairing block 54 may comprise an integrated compressible material section 75 to transition the seal from the blade 70 around the aft end of the fairing 18. The compressible material of the aft fairing block 54 may comprise foam encased in reinforced silicone. The compliant, compressible material ensures a seal against the aft fairing block of the second seal portion 50 (depicted in FIGS. 11A and 11B), discussed in further detail below.

Turning briefly back to FIG. 6, the forward transition block 56 extends from the elongated middle region 52 opposite to the aft fairing block 54, or from a forward end 76 of the middle region 52. The forward transition block 56 bends around the forward end of the fairing 18 with the curvature of the recess 36 formed in the duct wall 22. Turning to FIG. 8C, the forward transition block 56 may include a lower portion 78 extending from the tab portion 68 of the middle region 52 and an upper portion 80 connected to the blade 70 of the middle region 52 and extending from the lower portion 78. The lower portion 78 and/or the upper portion 80 may include compressible material 75, such as foam encased in reinforced silicone. The forward transition block 56 may also include ply reinforcements 72.

Figure 10A:
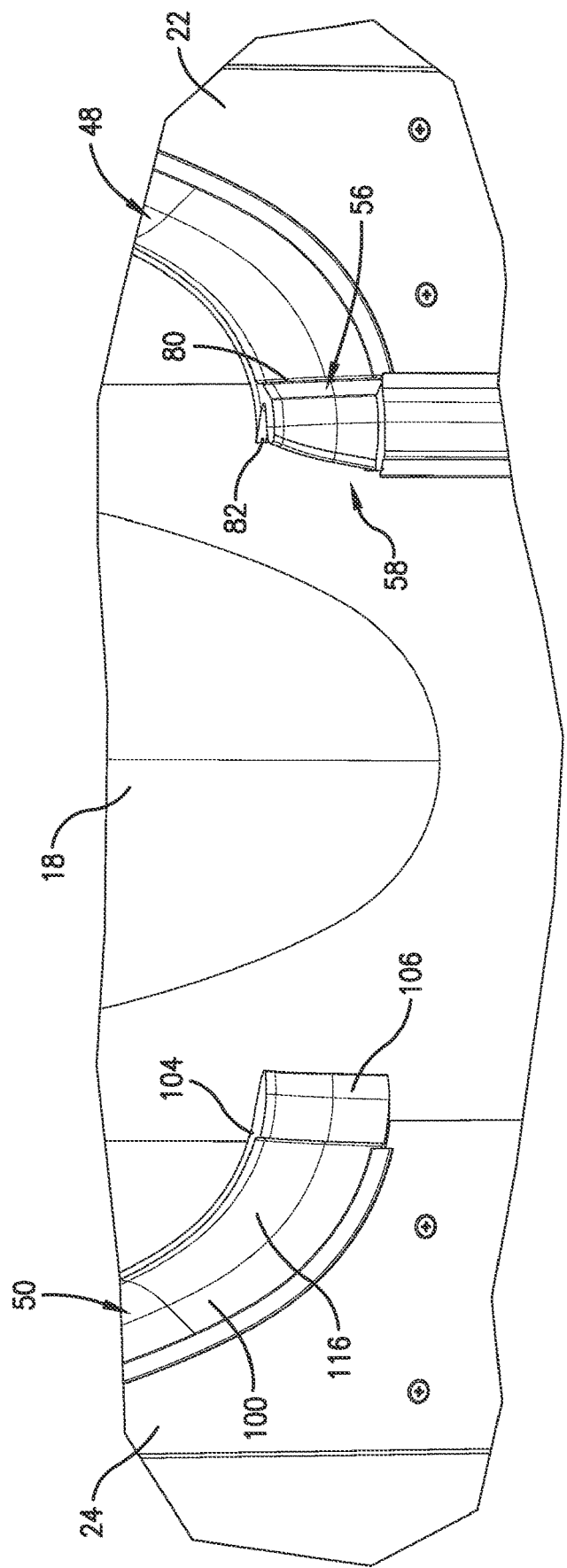
FIG. 10A is a fragmentary front perspective view of the duct assembly of FIG. 3 with coupling mechanisms of the sealing structure disconnected.

Turning to FIGS. 10A and 10B, the first coupling mechanism 58 is connected to the forward transition block 56 and is operable to couple to a portion of the second seal portion 50, discussed in further detail below. As used herein, "connected to" includes being formed in, extending from, being integral to, or otherwise having some physical contact or *nexus* with. The first coupling mechanism 58 may comprise a cavity 82 (also depicted in FIG. 8C) for receiving an insert of the second seal portion 50 formed in the forward transition block 56. In some embodiments, and as depicted in FIGS. 10A and 10B, the cavity 82 comprises a groove that extends a height of the upper portion 80 of the forward transition block 56. In some embodiments, the material around the groove or cavity 82 comprises foam surrounded in rubber, which makes the coupling mechanism 58 more compliant to receive the insert from the second seal portion 50. When the duct walls 22, 24 are closing around the fairing 18, the inboard corner of the forward transition block 56 flexes and slides along the surface of the fairing 18. Similar to the blade 70 of the middle region 52, air pressure within the duct 10 aids in maintaining contact between the engine fairing 18 and the forward transition block 56.

Figure 13A:
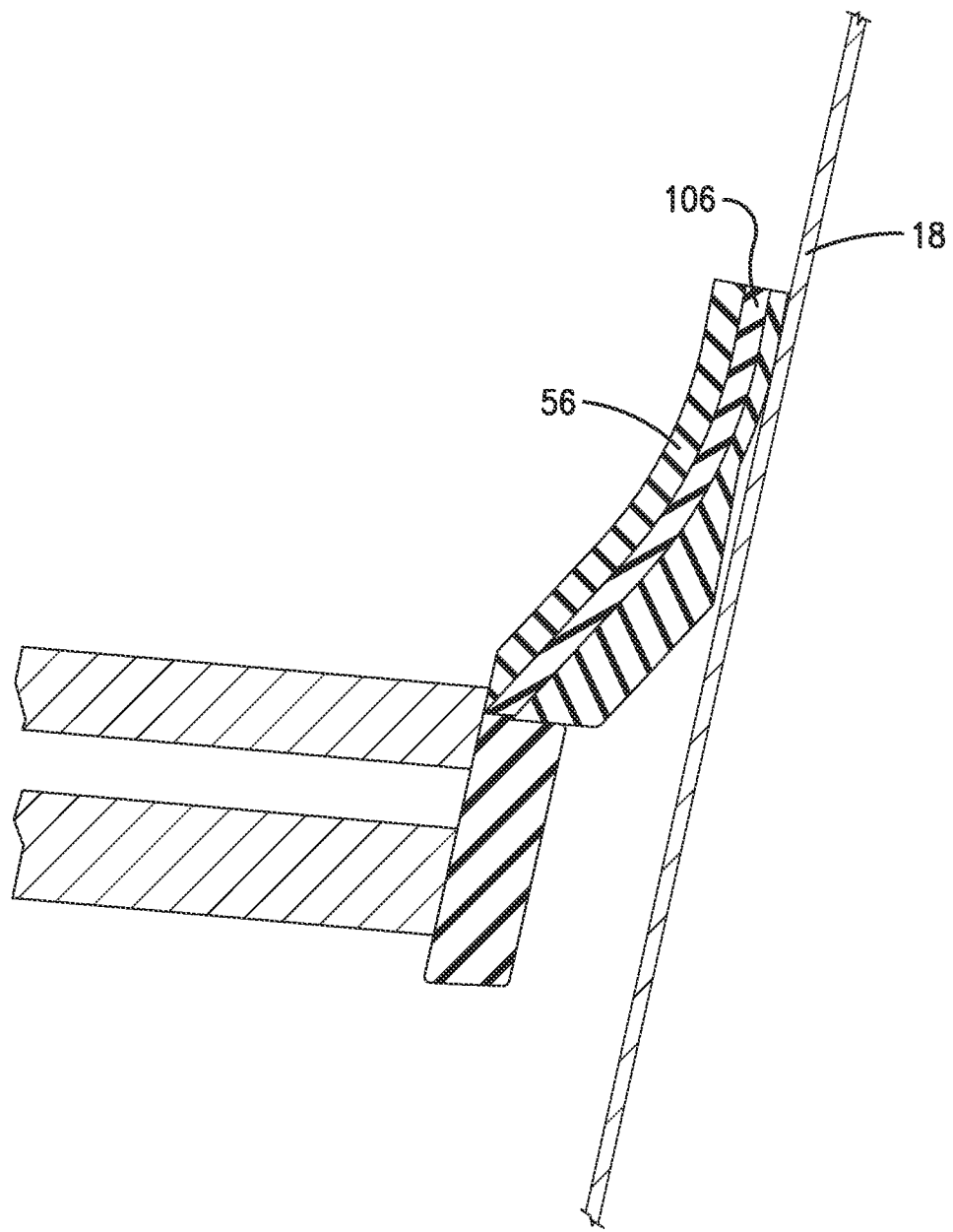
FIG. 13A is a sectional view of the forward transition block of the first seal portion attached to a duct wall of the duct assembly of FIG. 3C along line 13A, 13B, 13C-13A, 13B, 13C and abutting the forward end of the engine fairing at a normal position.
Figure 13B:
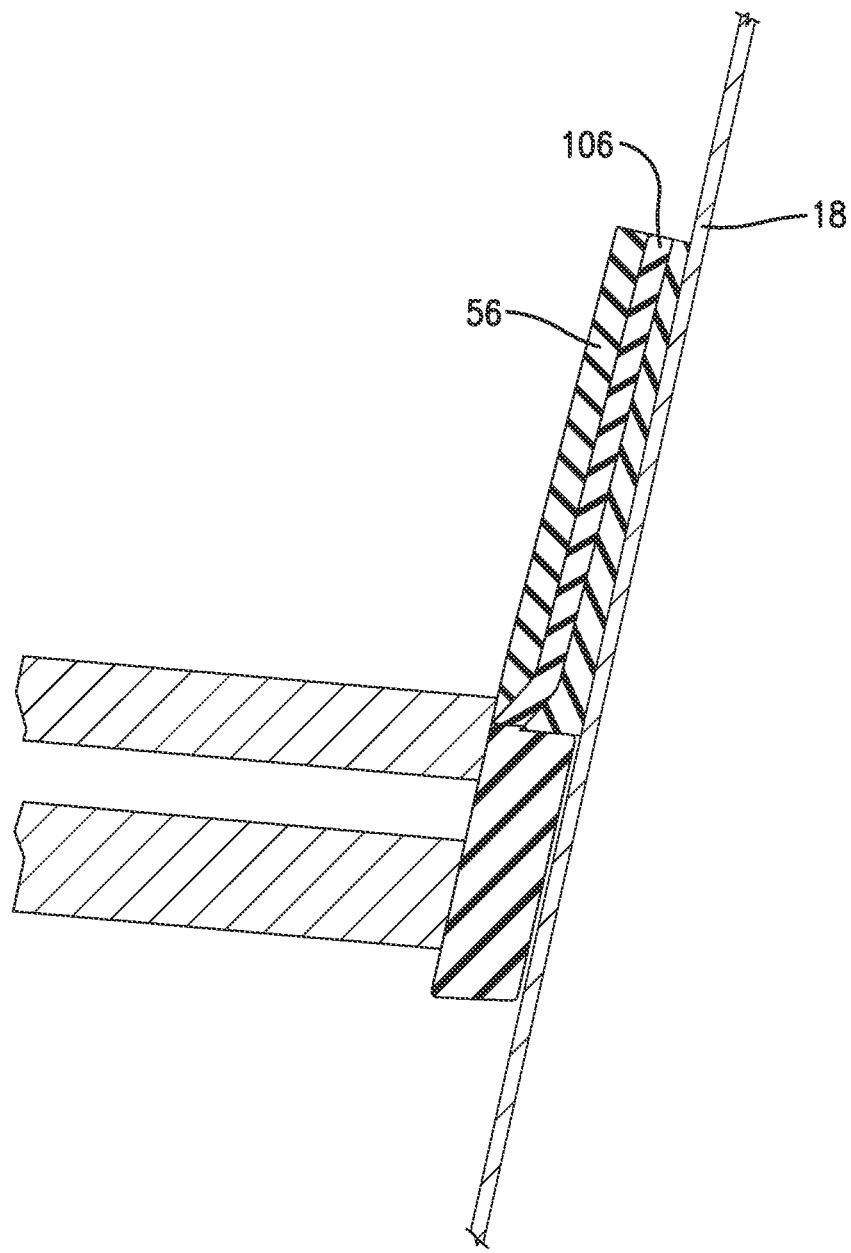
FIG. 13B is a sectional view of the forward transition block of FIG. 13A abutting the forward end of the engine fairing at a laterally displaced position proximal to the forward transition block.
Figure 13C:
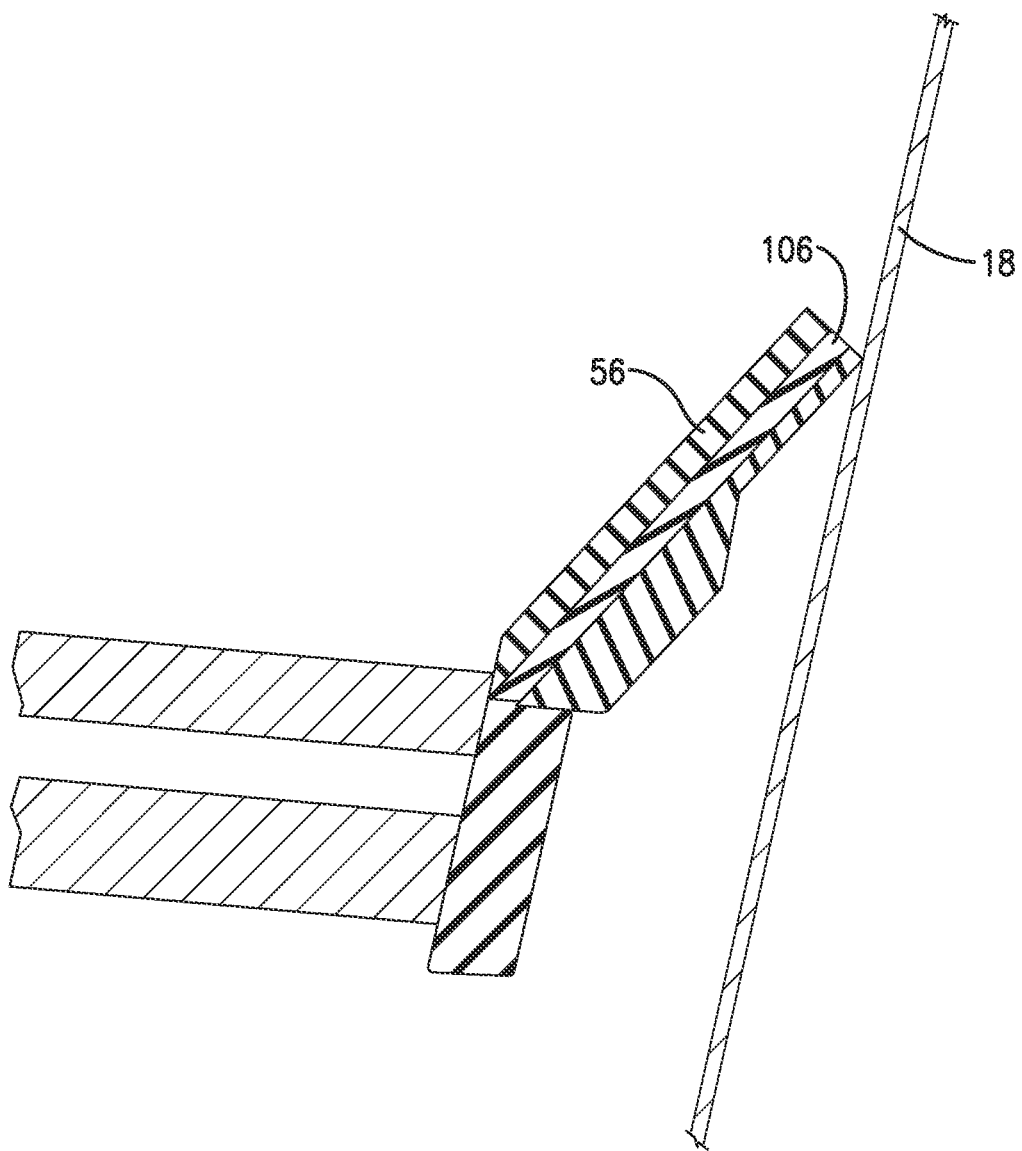
FIG. 13C is a sectional view of the forward transition block of FIG. 13A abutting the forward end of the engine fairing at a laterally displaced position distal to the forward transition block.

Turning to FIGS. 13A-13C, the forward transition block 56 can maintain the seal when the fairing 18 is displaced relative to the duct walls 22, 24. In some embodiments, the forward transition block 56 maintains a seal when the fairing 18 moves toward the forward transition block 56 (as depicted in FIG. 13B) to about 0.5 mm from the forward transition block 56. The forward transition block 56 also maintains the seal when the fairing 18 moves away from the forward transition block 56 (as depicted in FIG. 13C) to a distance of about 35 mm. In preferred embodiments, the forward transition block 56 maintains the seal from about 1 mm up to about 30.48 mm. In some embodiments, the fairing 18 may be normally positioned at a distance from the forward transition block 56 (as depicted in FIG. 13A). In some embodiments, the fairing may be normally positioned about 16 mm to about 19.6 mm from the forward transition block 56. In preferred embodiments, the forward transition block 56 is positioned about 17.78 mm from the forward transition block 56. The forward transition block 56 may be operable to maintain the seal when the fairing 18 shifts from its origin in direction away from the forward transition block 56 by about 11 mm to about 14.4 mm. In preferred embodiments, the forward transition block 56 maintains the seal when the fairing 18 shifts from its origin in direction away from the forward transition block 56 by about 12.7 mm. In one or more embodiments, the forward transition block 56 maintains the seal when the fairing 18 shifts from its origin in direction away from the forward transition block 56 by any distance without departing from the scope of the present invention.

Turning back to FIG. 6, the forward elongated portion 60 may extend from the forward transition block 56. Specifically, the forward elongated portion 60 may extend from the lower portion 78 of the forward transition block 56 and may provide a seal between the duct walls 22, 24 on the portions of their interfaces 34, 44 that are forward of the recesses 36, 46. The forward elongated portion 60 includes an aft end 84 connected to the forward transition block 56 and a forward end 86 opposite to the aft end 84. Turning to FIG. 8B, the forward elongated portion 60 may comprise a middle region 88 with a T-shape cross section. The middle region 88 may be secured to the interface 34 of the first duct wall 22. The forward elongated portion 60 may also include a blade 90 that extends obliquely from the middle region 88 for abutting the interface 44 of the other duct wall 24. The forward elongated portion 60 may comprise reinforced silicone and ply reinforcements 72.

Turning to FIG. 7, the forward duct block 62 extends from the forward end 76 of the forward elongated portion 60 and provides a seal between the forward ends of the duct wall interfaces 34, 44 and a seal along at least a portion of the forward edges 28, 38 of the duct walls 22, 24. The forward duct block 62 may comprise thicker regions 75 including compressible material, such as foam encased in reinforced silicone or pre-preg, as depicted in FIG. 8A.

Figure 8F:
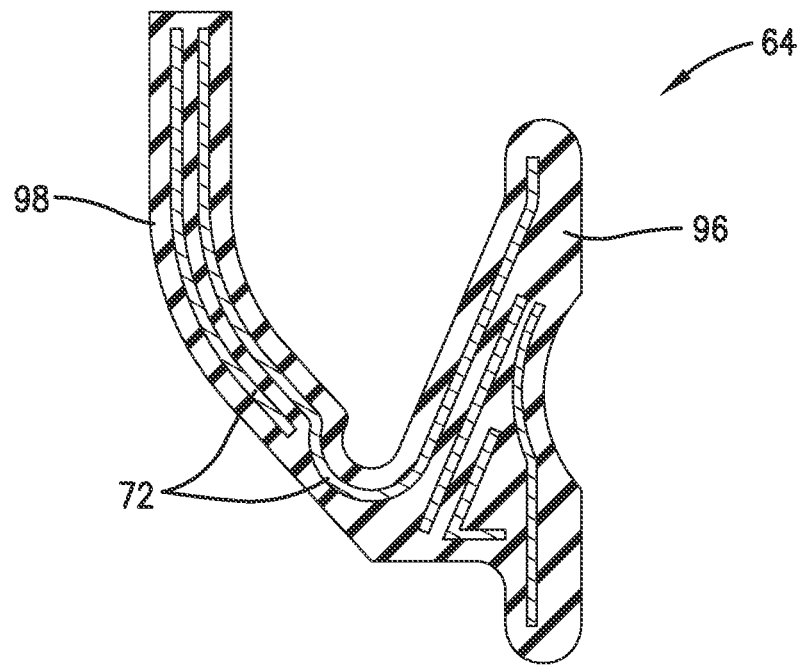
FIG. 8F is a sectional view of an aft elongated portion of the first seal portion of the sealing structure of FIG. 6 along line 8F-8F.
Figure 8G:
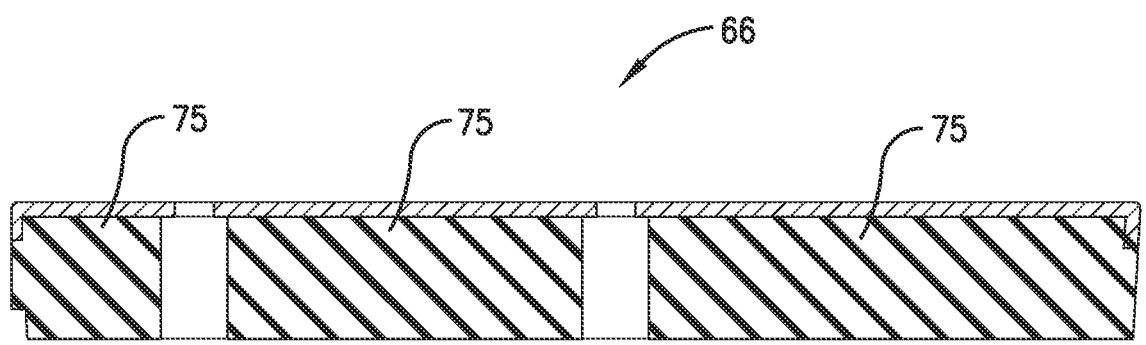
FIG. 8G is a sectional view of an aft duct block of the first seal portion of FIG. 7 along line 8G-8G.

Turning back to FIG. 6, the aft elongated portion 64 extends from the aft fairing block 54 and includes a forward or proximal end 92 connected to the aft fairing block 54 and an aft or distal end 94 opposite to the forward end 92. The aft elongated portion 64 provides a seal between portions of the interfaces 34, 44 of the duct walls 22, 24 between the recesses 36, 46 and the aft edges 30, 40 of the duct walls 22, 24. Turning to FIG. 8F, the aft elongated portion 64 may include a middle region 96 that may be secured to the interface 34 of the duct wall 22 and a blade portion 98 extending obliquely from the middle region 96. The blade portion 98 may abut the interface 44 of the other duct wall 24 to provide a seal. In some embodiments, the aft elongated portion 64 comprises reinforced silicone, such as ply reinforcements 72.

Turning back to FIG. 7, the aft duct block 66 extends from the aft end 94 of the aft elongated portion 64 and provides a seal between the aft ends of the duct wall interfaces 34, 44. The aft duct block 66 may comprise thicker regions 75 including compressible material, such as foam encased in reinforced silicone or pre-preg, as depicted in FIG. 6G.

Turning back to FIG. 5, the second seal portion 50 comprises an elongated middle region 100, an aft fairing block 102, a forward transition block 104, and a second coupling mechanism 106. The elongated middle region 100 includes a tab portion 108 for securing to the fan duct interface 44 and a flexible center blade 110 extending at an angle relative to the tab portion 108 for abutting the fairing 18. The tab portion 108 is for securing to the duct interface 44 of one of the duct walls 24 and may extend the length of the recess 46 of the duct interface 44. The tab portion 108 may be secured to the duct interface 44 via fasteners, bonding or adhesives, or the like. The tab portion 108 may be made of reinforced silicone.

The flexible center blade 110 extends at an angle relative to the tab portion 108, as depicted in FIG. 9B, toward the fairing 18 so that it abuts the fairing 18. The flexible center blade 110 may extend the length of the fairing 18 and may comprise internal pre-preg fiberglass ply reinforcements 112 that are staggered in a fore-aft direction to allow for conformance of the blade 110 to the fairing 18. The center blade 110 may also include a section of pre-preg material 113. Too much interface (the blade 110 bending too much against the fairing 18) could affect the quality of the seal at the forward end of the fairing 18. Thus, the center blade 110 is angled relative to the tab portion 108 and sufficiently tall enough to cover the space between the duct wall 24 and the fairing 18.

As discussed above, due to installation tolerances, rigging in a static condition, thermal and structural deflections in flight, the axially and lateral relative motions between the fairing 18 and the duct walls 22, 24 are relatively large. Thus, the space between the fairing 18 and the duct wall 24 may have a length of about 6 mm to about 51 mm or about 12.7 mm to about 45.72 mm. In other words, the center blade 110 is angled relative to the tab portion 108 and sufficiently tall enough to maintain a seal with the fairing 18 when the fairing 18 is laterally displaced in either direction by about 15 mm to about 20 mm from its normal position. In preferred embodiments, the center blade 110 is angled relative to the tab portion 108 and sufficiently tall enough to maintain a seal with the fairing 18 when the fairing 18 is laterally displaced about 17.526 mm in either direction. In one or more embodiments, the center blade 110 is angled relative to the tab portion 108 and sufficiently tall enough to maintain a seal with the fairing 18 when the fairing 18 is laterally displaced by any distance without departing from the scope of the present invention.

Turning to FIGS. 11A and 11B, the aft fairing block 102 of the second seal portion 50 extends from the middle region 100 of the second seal portion 50. Specifically, the aft fairing block 102 may extend from an aft end 114 of the middle region 100. The aft fairing block 102 may have an aerodynamic shape, such as a tetrahedronal shape pointed in an aft direction and may comprise compressible material. For example, as shown in FIG. 9C, the aft fairing block 102 may comprise an integrated compressible material section 75 to transition the seal from the blade 110 around the aft end of the fairing 18. The compressible material of the aft fairing block 102 may comprise foam encased in reinforced silicone. The aft fairing block 102 may also include ply reinforcement materials 112. The compliant, compressible material ensures a seal against the aft fairing block 54 of the first seal portion 48 (depicted in FIGS. 11A and 11B). The inner surface of the aft fairing block 102 may be complementary to the aft fairing block 54 of the first seal portion 48.

Figure 9A:
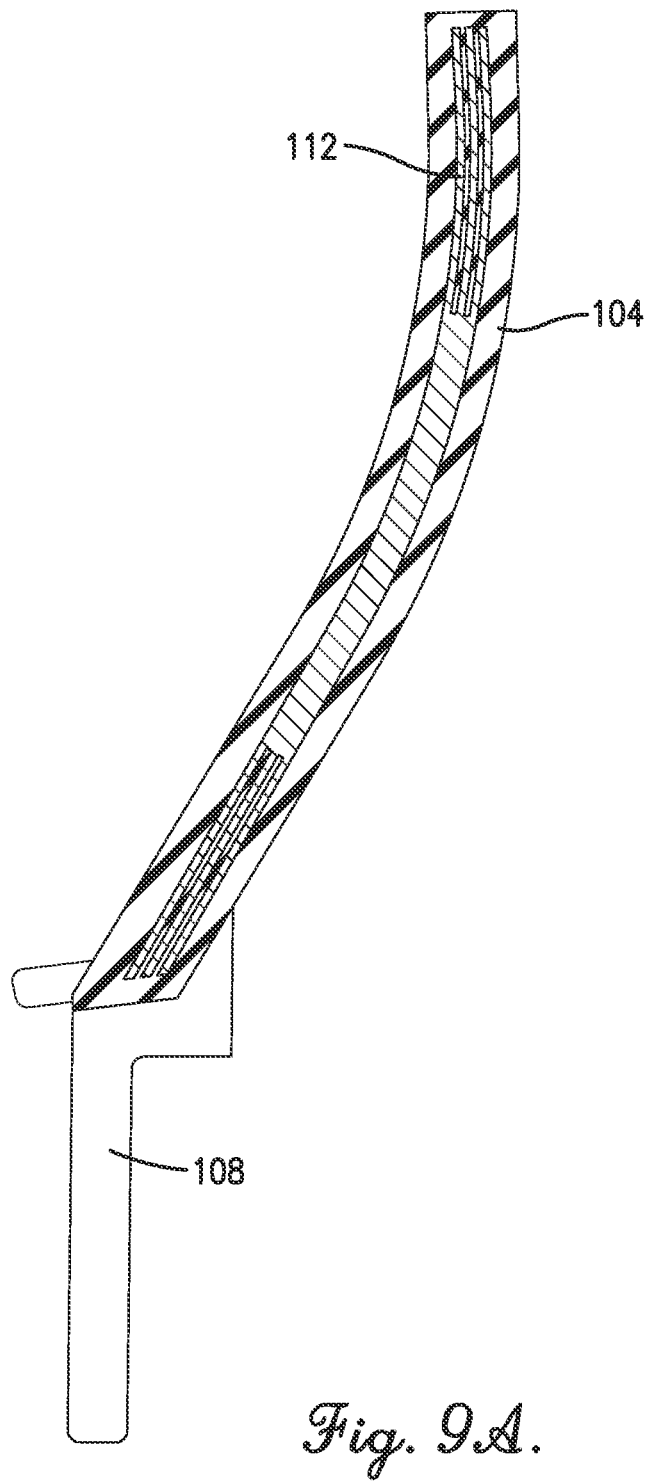
FIG. 9A is a sectional view of a forward transition block of a second seal portion of the seal structure of FIG. 6 along line 9A-9A.

Turning to FIGS. 10A and 10B, the forward transition block 104 extends from the elongated middle region 100 opposite to the aft fairing block 102, or from a forward end 116 of the middle region 100. In some embodiments, the forward transition block 104 and/or the second coupling mechanism 106 may only extend from the blade portion 110 of the middle region 100 (as depicted in FIGS. 9A and 10A). The second coupling mechanism 106 may be connected to the forward transition block 104 and is operable to couple to the first coupling mechanism 58. The second coupling mechanism 106 may comprise an insert that fits within the cavity 82 of the first coupling mechanism 58. The insert may comprise a wedge-shaped tongue or insert that is complementary to at least a portion of the groove of the first coupling mechanism 58. The second coupling mechanism 106 may comprise harder rubber that is harder compared to the foam sections of the first coupling mechanism 58 and that grips the inner surface of the groove.

While the first seal portion 48 is depicted as being on the first duct 22, the seal portion 48 may be configured to be secured to the second duct wall 24 without departing from the scope of the present invention. Further, the forward and aft elongated portions 60, 64 and their corresponding blocks 62, 66 may be attached to either of the seal portions 48, 50 without departing from the scope of the present invention. Additionally, the second coupling mechanism 106 may comprise a groove, and the first coupling mechanism 58 may comprise a tab without departing from the scope of the present invention. Further, other types of coupling devices may be used to temporarily couple the forward transition blocks without departing from the scope of the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A sealing structure for sealing a space between first and second parts of a fan duct and a fairing of an aircraft engine, the sealing structure comprising:
   a first seal portion for positioning between the fairing and the first part of the fan duct, the first seal portion comprising:
      an elongated middle region for securing to the first part of the fan duct and abutting the fairing, the elongated middle region including a forward end, and
      a first coupling mechanism extending from the forward end; and
   a second seal portion for positioning between the fairing and the second part of the fan duct, the second seal portion comprising:
      an elongated middle region for securing to the second part of the fan duct and abutting the fairing, the elongated middle region including a forward end, and
      a second coupling mechanism extending from the forward end and operable to couple to the first coupling mechanism;
   wherein the first seal portion and the second seal portion are attached to the first and second parts of the fan duct such that when the first and second parts of the fan duct are brought together to close the fan duct on the fairing, the second coupling mechanism engages the first coupling mechanism to temporarily couple to the first coupling mechanism and the first seal portion and the second seal portion deform against an outer perimeter of the fairing to seal the space between the first and second parts of the fan duct and the fairing.

2. The sealing structure of claim 1, wherein the first coupling mechanism comprises a cavity, and the second coupling mechanism comprises an insert that fits within the cavity of the first coupling mechanism.

3. The sealing structure of claim 2, wherein the cavity comprises a groove that extends along the forward end of the first seal portion, and the insert comprises a tab that is complementary to at least a portion of the groove.

4. The sealing structure of claim 1, wherein—
   the first seal portion comprises:
      an aft fairing block extending from an aft end of the elongated middle region of the first seal portion and comprising compressible material, and
      a forward transition block extending from the forward end of the elongated middle region of the first seal portion and comprising compressible material; and
   the second seal portion comprises:
      an aft fairing block extending from an aft end of the elongated middle region of the second seal portion and including compressible material, and
      a forward transition block extending from the forward end of the elongated middle region of the second seal portion and comprising compressible material.

5. The sealing structure of claim 4, wherein the compressible material of the aft fairing block of at least one of the first seal portion or the second seal portion comprises foam encased in reinforced silicone.

6. The sealing structure of claim 1, wherein the elongated middle region of at least one of the first seal portion or the second seal portion comprises:
   a tab portion for securing to the first part of the fan duct, and
   a flexible center blade extending at an angle relative to the tab portion for abutting the fairing.

7. The sealing structure of claim 1, wherein the first seal portion comprises:
   a forward blade portion extending from the first coupling mechanism and including an aft end connected to the first coupling mechanism and a forward end opposite to the aft end, and
   a forward duct block extending from the forward end of the forward blade portion and comprising compressible material.

8. The sealing structure of claim 7, wherein the forward blade portion comprises reinforced silicone, and the compressible material comprises foam encased in reinforced silicone.

9. The sealing structure of claim 1, wherein the middle region of the first seal portion includes an aft end, wherein the first seal portion comprises:
   an aft blade portion extending from the aft end of the middle region of the first seal portion and including a proximal end connected to the aft end of the middle region of the first seal portion and a distal end opposite to the proximal end, and
   an aft duct block extending from the distal end of the aft blade portion and comprising compressible material.

10. The sealing structure of claim 9, wherein the aft blade portion comprises reinforced silicone, and the compressible material comprises foam encased in reinforced silicone.

11. An aircraft duct assembly for an engine having an engine fairing, the aircraft duct assembly comprising:
    a first duct wall comprising:
       a first forward edge,
       a first aft edge opposite the first forward edge, and
       a first duct interface extending from the first forward edge to the first aft edge and having a first recess that defines a portion of a cavity for receiving the engine fairing;
    a second duct wall for cooperatively enclosing at least a portion of the engine with the first duct wall, the second duct wall comprising:
       a second forward edge,
       a second aft edge opposite the second forward edge, and
       a second duct interface extending from the second forward edge to the second aft edge and having a second recess that defines a portion of the cavity for receiving the engine fairing; and
    a sealing structure for sealing a space between the engine fairing and the first duct wall and the second duct wall, the sealing structure comprising:
       a first seal portion secured to at least a portion of the first duct interface, the first seal portion comprising a forward end with a first coupling mechanism, and
       a second seal portion secured to at least a portion of the second duct interface, the second seal portion comprising a forward end with a second coupling mechanism that couples to the first coupling mechanism.

12. The aircraft duct assembly of claim 11, wherein the first coupling mechanism comprises a cavity, and the second coupling mechanism comprises an insert that fits within the cavity of the first coupling mechanism.

13. The aircraft duct assembly of claim 11, wherein:
    the first seal portion comprises:
       a first tab portion for securing to the first recess of the first duct interface and comprising reinforced silicone, and
       a first flexible center blade extending at an angle relative to the first tab portion for abutting the engine fairing and comprising pre-preg; and
    the second seal portion comprises:
       a second tab portion for securing to the second recess of the second duct interface and comprising reinforced silicone, and
       a second flexible center blade extending at an angle relative to the second tab portion for abutting the engine fairing and comprising pre-preg.

14. The aircraft duct assembly of claim 11, wherein the first seal portion further comprises:
    a forward blade portion extending between the first forward edge and the first recess on the first duct interface;
    a forward duct block extending from the forward blade portion proximate to the first forward edge and comprising compressible material;
    an aft blade portion extending between the first aft edge and the first recess on the first duct interface; and
    an aft duct block extending from the aft blade portion proximate to the first aft edge and comprising compressible material.

15. A sealing structure for sealing a space between first and second parts of a fan duct and a fairing of an aircraft engine, the sealing structure comprising:
    a first seal portion for positioning between the fairing and the first part of the fan duct, the first seal portion comprising:
       an elongated middle region including a tab portion for securing to the first part of the fan duct and a flexible center blade extending at an angle relative to the tab portion for abutting the fairing,
       an aft fairing block extending from the middle region and comprising compressible material, and
       a forward transition block extending from the elongated middle region opposite to the aft fairing block and including compressible material, and
       a first coupling mechanism connected to the forward transition block; and
    a second seal portion for positioning between the fairing and the second part of the fan duct, the second seal portion comprising
       an elongated middle region including a tab portion for securing to the second part of the fan duct and a flexible center blade extending at an angle relative to the tab portion for abutting the fairing,
       an aft fairing block extending from the middle region and operable to abut the aft fairing block of the first seal portion, and
       a forward transition block extending from the elongated middle region opposite to the aft fairing block, and
       a second coupling mechanism that is operable to couple to the first coupling mechanism.

16. The sealing structure of claim 15, wherein the center blade of at least one of the first seal portion or the second seal portion comprises pre-preg.

17. The sealing structure of claim 16, wherein the tab portion of at least one of the first seal portion or the second seal portion comprises reinforced silicone.

18. The sealing structure of claim 15, wherein the first seal portion further comprises:
- a forward blade portion extending from the forward transition block and having an aft end connected to the forward transition block and a forward end opposite to the aft end;
- a forward duct block extending from the forward end of the forward blade portion and comprising compressible material;
- an aft blade portion extending from the aft fairing block and having a forward end connected to the aft fairing block and an aft end opposite to the forward end; and
- an aft duct block extending from the aft end of the aft blade portion and comprising compressible material.

19. The sealing structure of claim 15, wherein the first coupling mechanism comprises a cavity, and the second coupling mechanism comprises an insert that fits within the cavity of the first coupling mechanism.

20. The sealing structure of claim 15, wherein the center blade of the first seal portion is angled relative to the tab portion to cover the space between the first part of the fan duct and the fairing.

\* \* \* \* \*